Jan. 19, 1954   R. A. CHRISTIAN ET AL   2,666,517
TABULATING MECHANISM FOR ACCOUNTING MACHINES
Original Filed Dec. 6, 1947   17 Sheets-Sheet 1
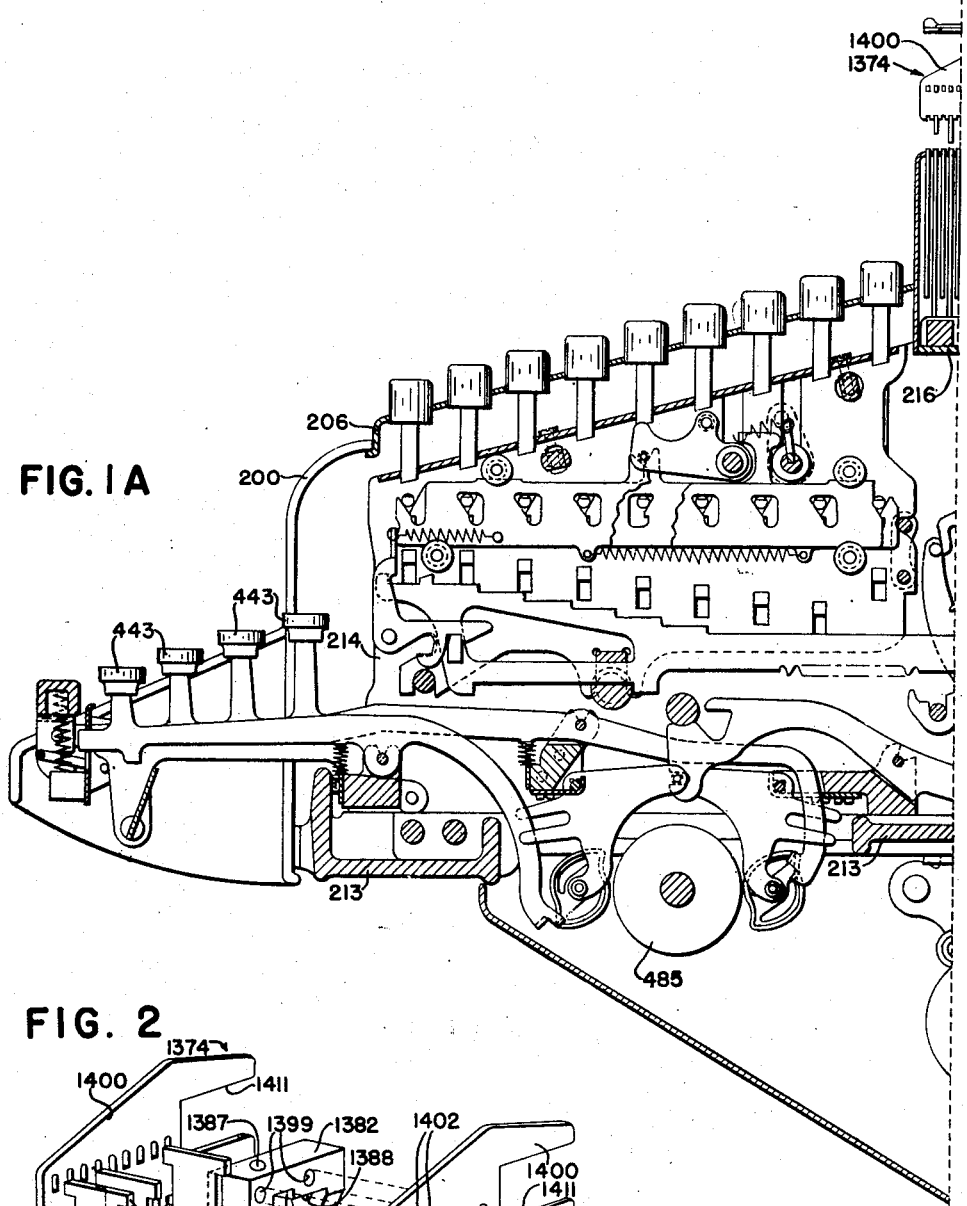
FIG. IA
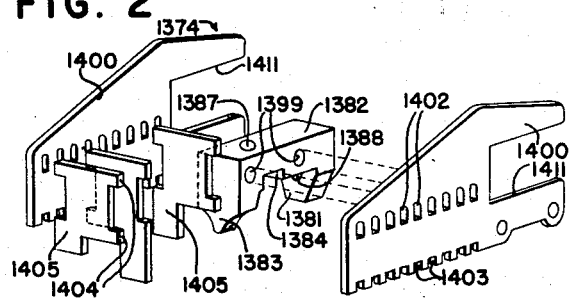
FIG. 2
INVENTORS
RAYMOND A. CHRISTIAN
JESSE R. GANGER
JAMES H. CRAWFORD &
HERBERT C. JOHNSON
BY
THEIR ATTORNEYS

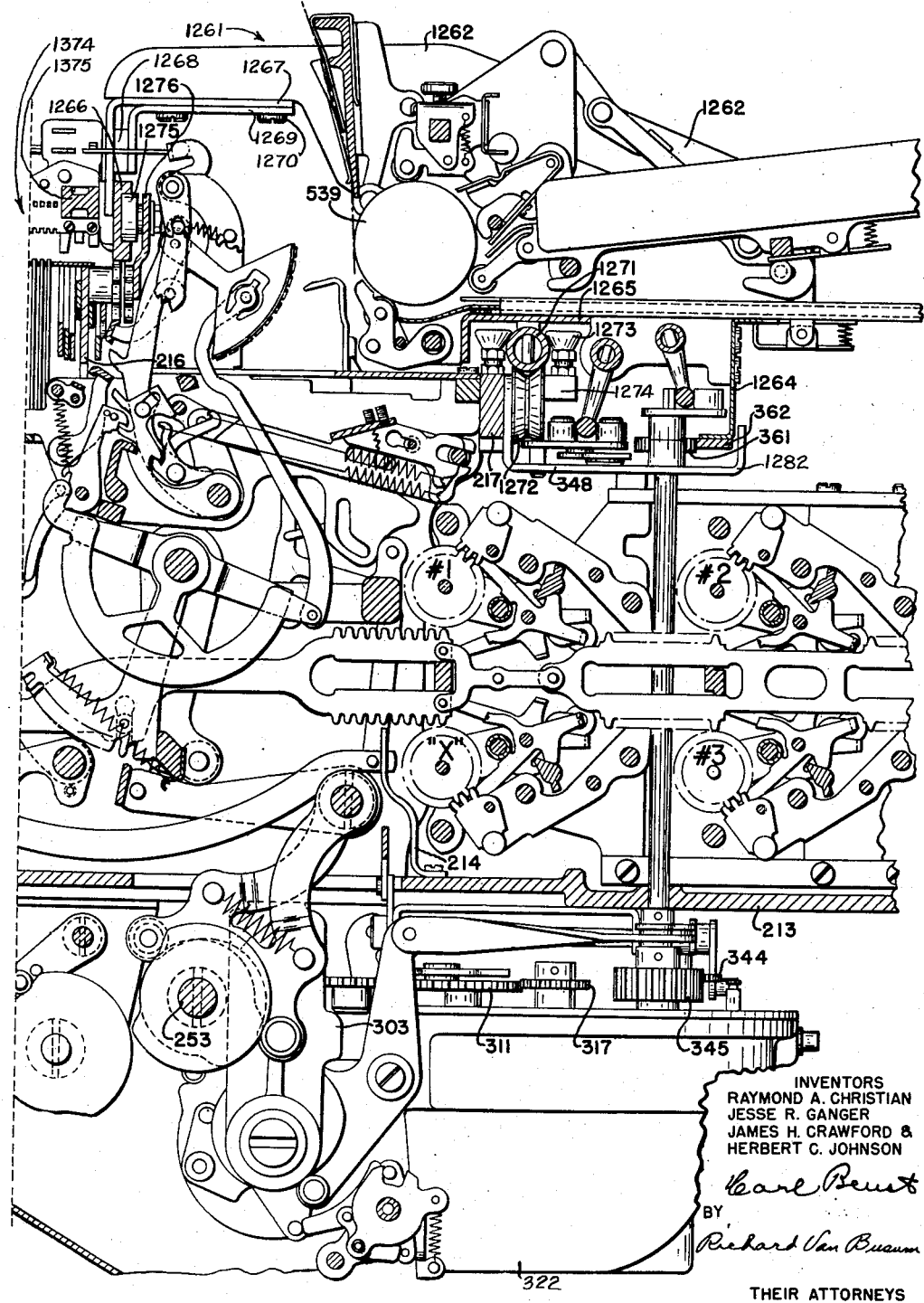

Jan. 19, 1954   R. A. CHRISTIAN ET AL   2,666,517
TABULATING MECHANISM FOR ACCOUNTING MACHINES
Original Filed Dec. 6, 1947   17 Sheets-Sheet 3

INVENTORS
RAYMOND A. CHRISTIAN
JESSE R. GANGER
JAMES H. CRAWFORD &
HERBERT C. JOHNSON

BY

THEIR ATTORNEYS

Jan. 19, 1954 — R. A. CHRISTIAN ET AL — 2,666,517
TABULATING MECHANISM FOR ACCOUNTING MACHINES
Original Filed Dec. 6, 1947 — 17 Sheets-Sheet 4

INVENTORS
RAYMOND A. CHRISTIAN
JESSE R. GANGER
JAMES H. CRAWFORD &
HERBERT C. JOHNSON
BY
THEIR ATTORNEYS

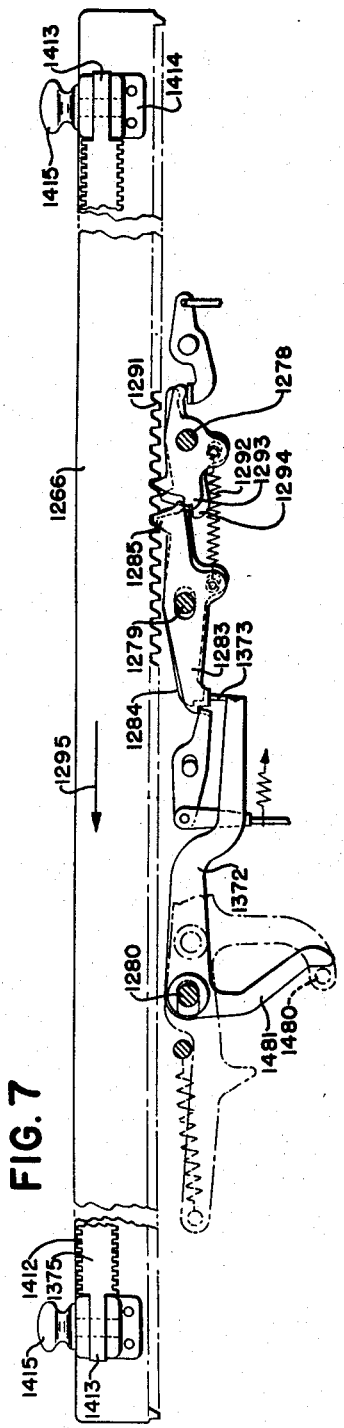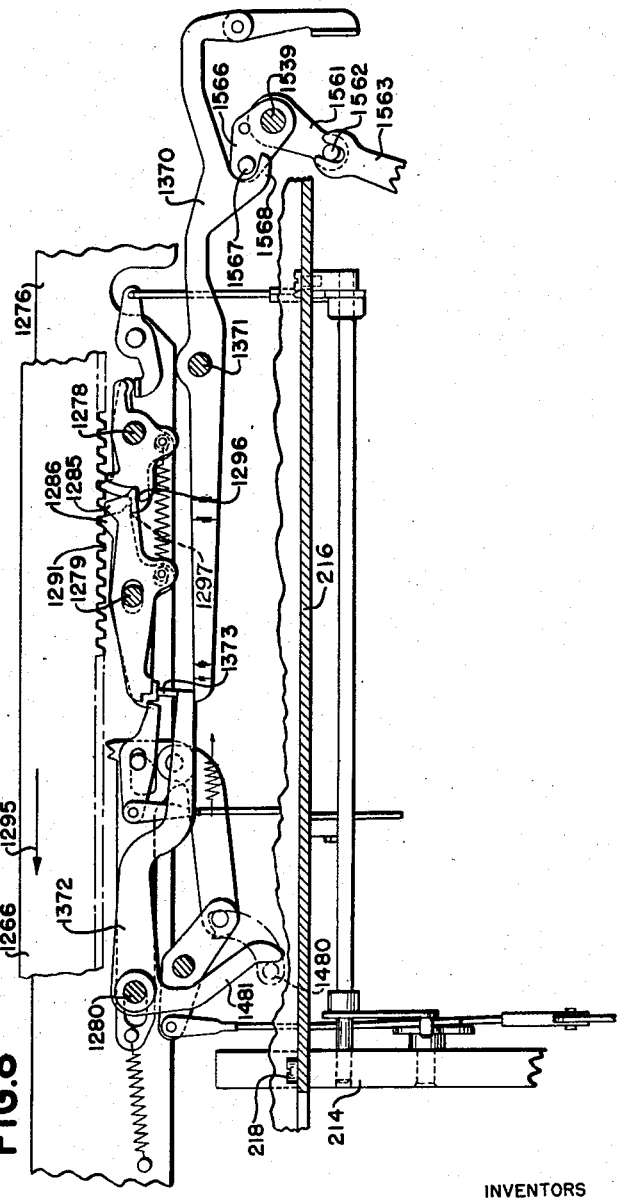

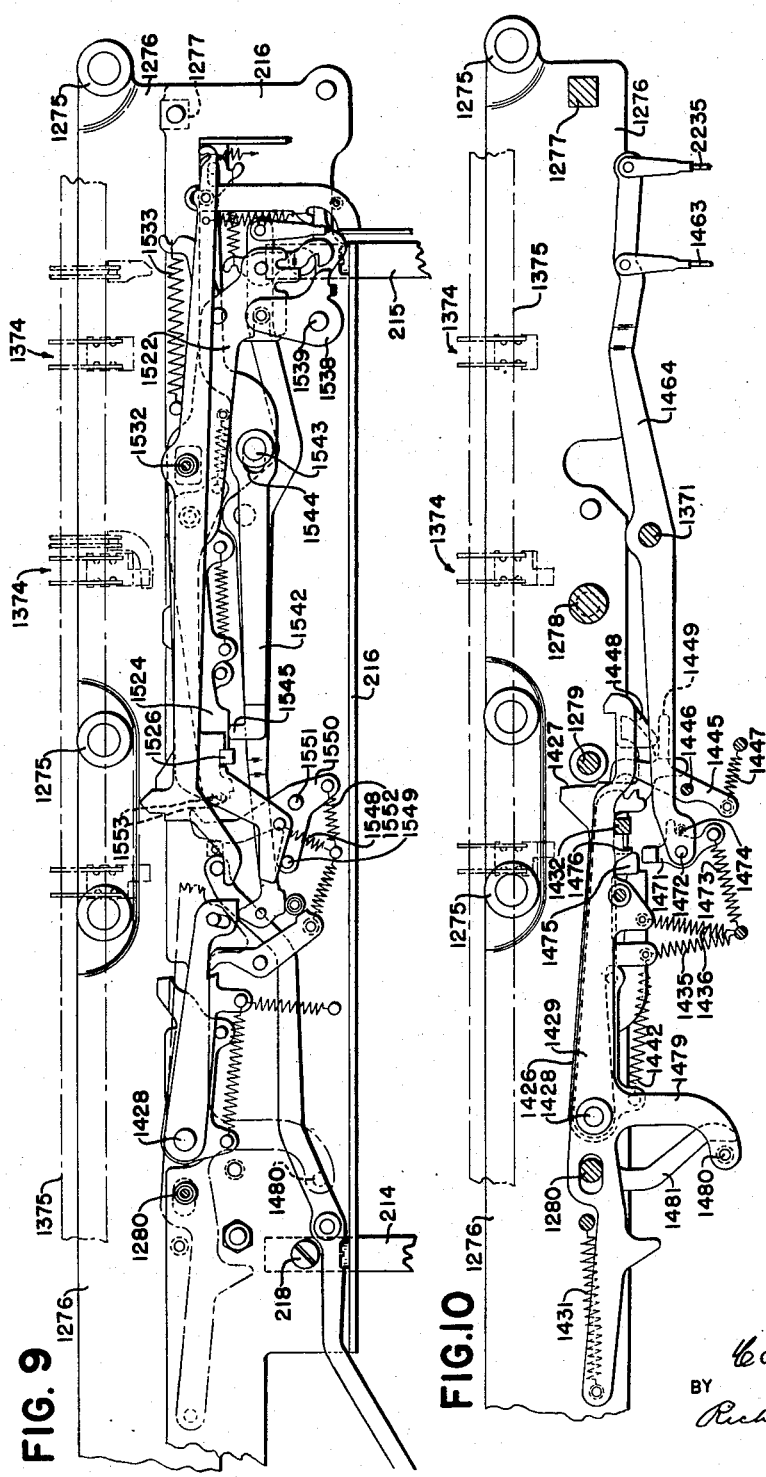

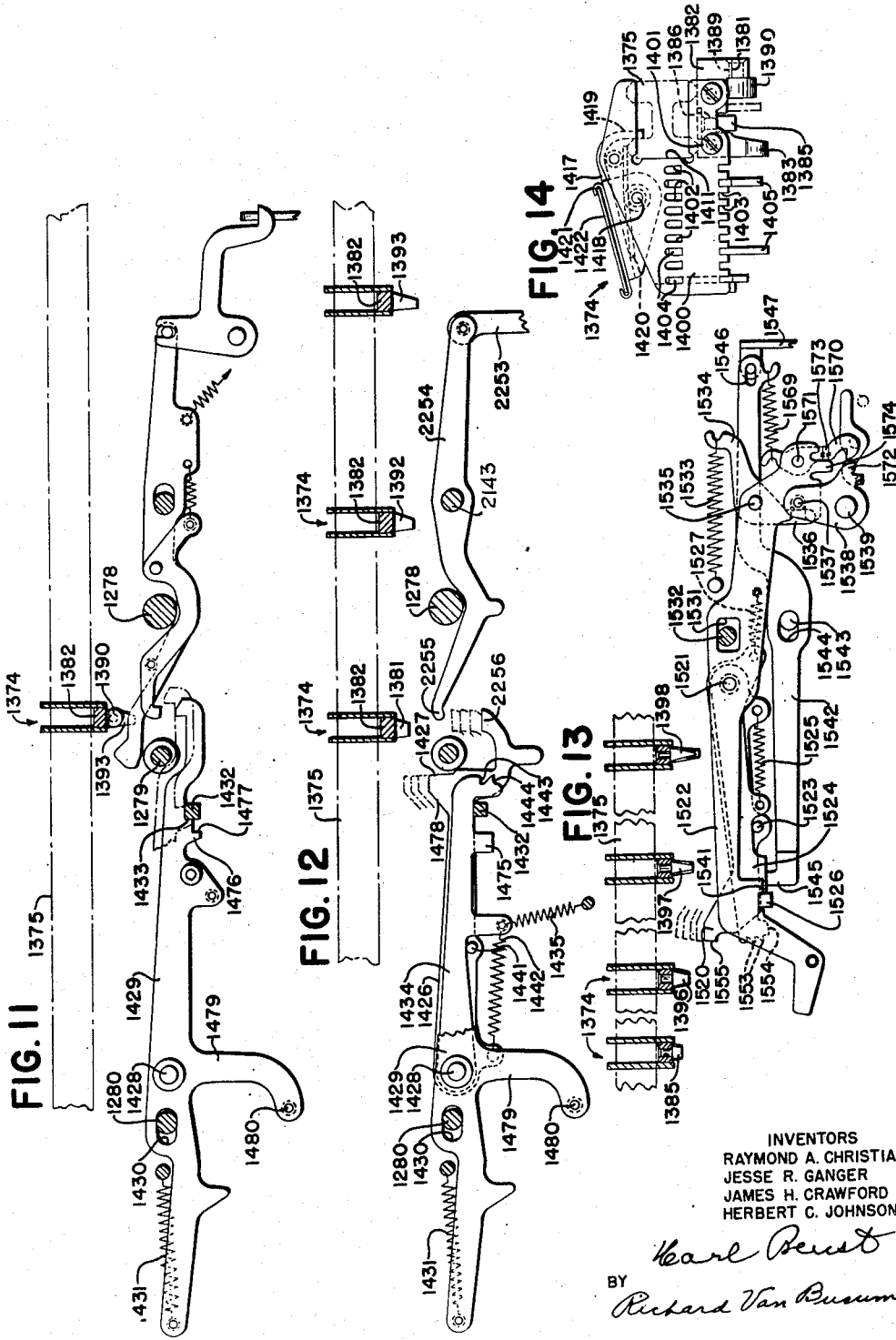

Jan. 19, 1954   R. A. CHRISTIAN ET AL   2,666,517
TABULATING MECHANISM FOR ACCOUNTING MACHINES
Original Filed Dec. 6, 1947   17 Sheets-Sheet 8

INVENTORS
RAYMOND A. CHRISTIAN
JESSE R. GANGER
JAMES H. CRAWFORD &
HERBERT C. JOHNSON

BY

THEIR ATTORNEYS

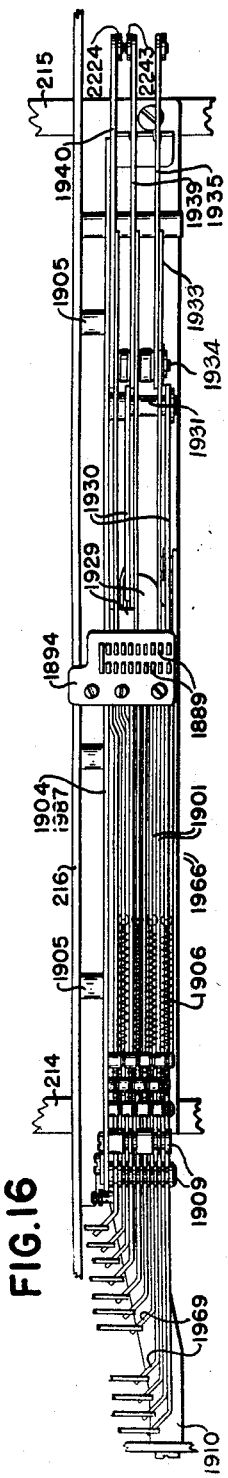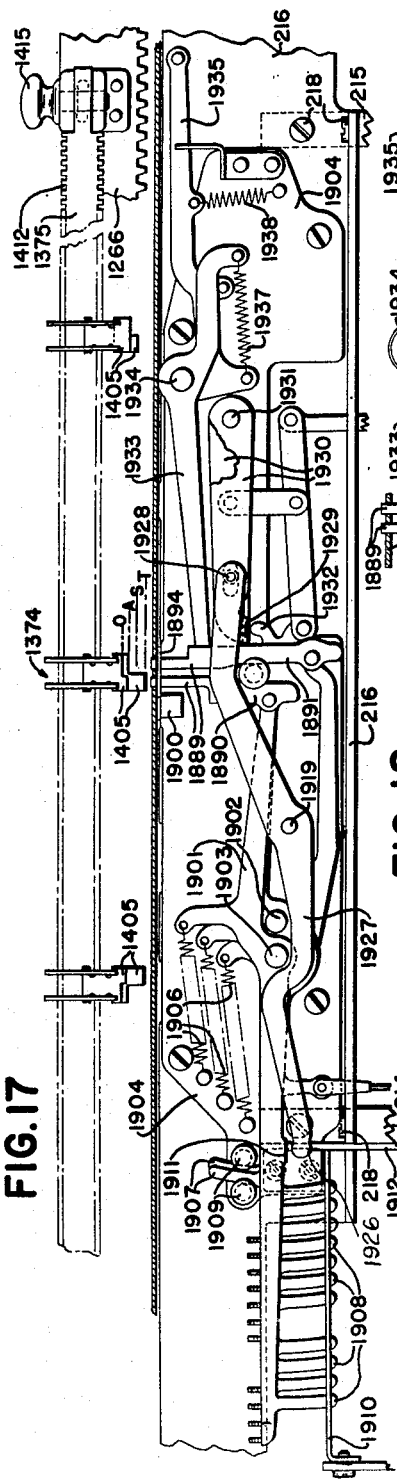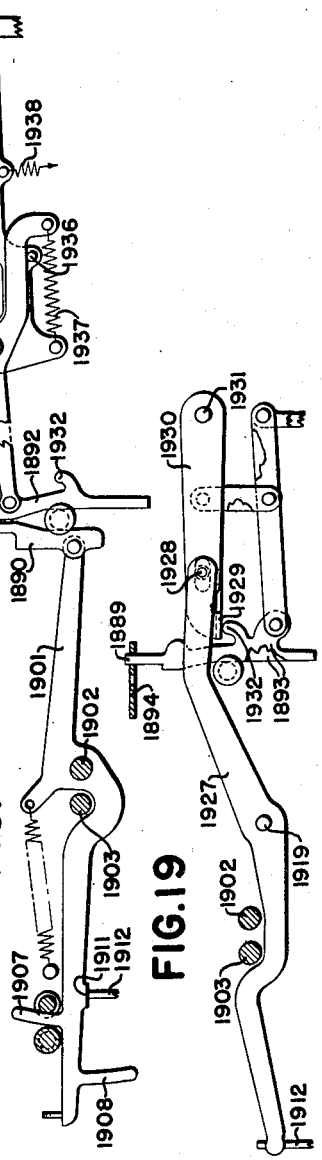

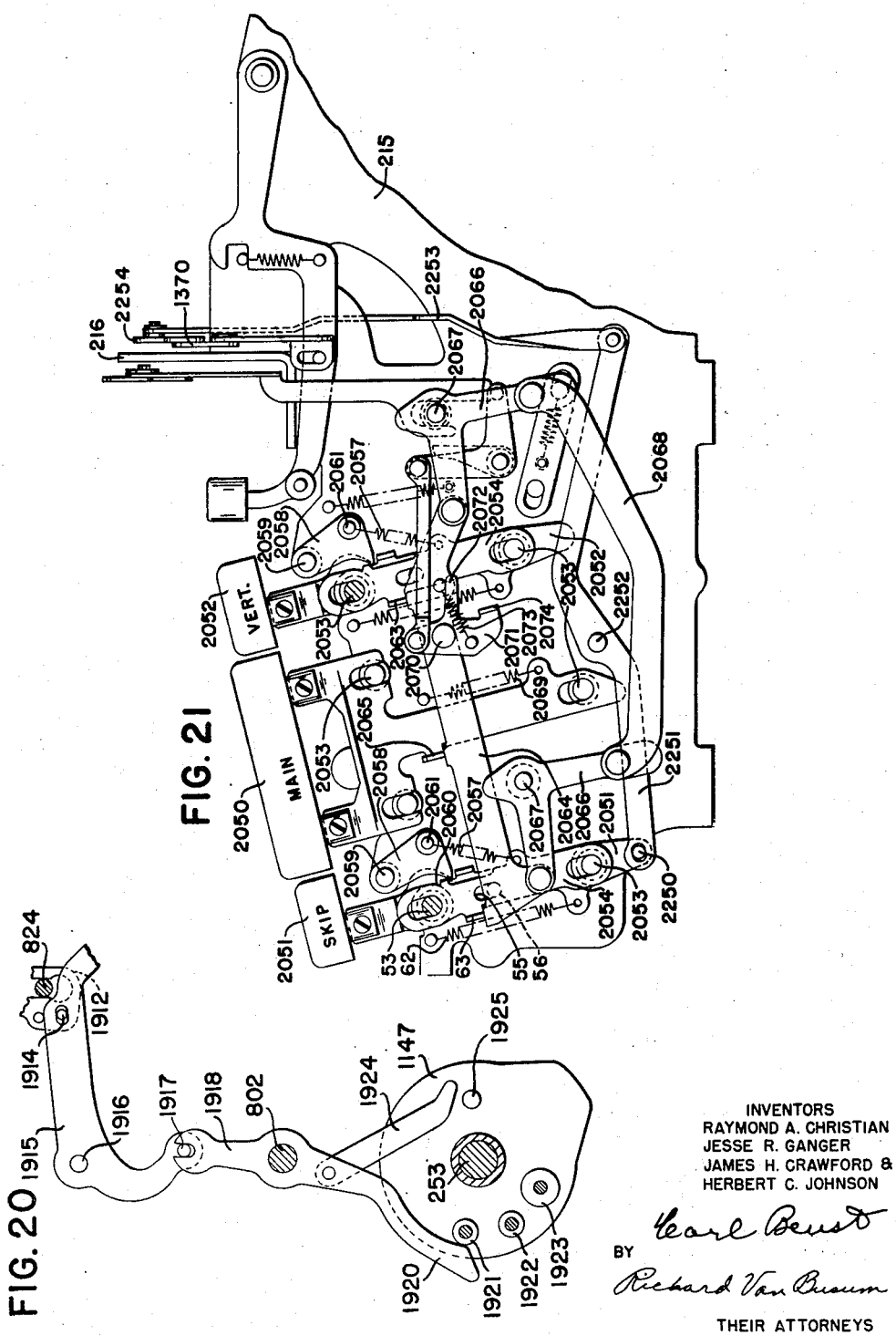

Jan. 19, 1954     R. A. CHRISTIAN ET AL     2,666,517
TABULATING MECHANISM FOR ACCOUNTING MACHINES
Original Filed Dec. 6, 1947     17 Sheets-Sheet 11
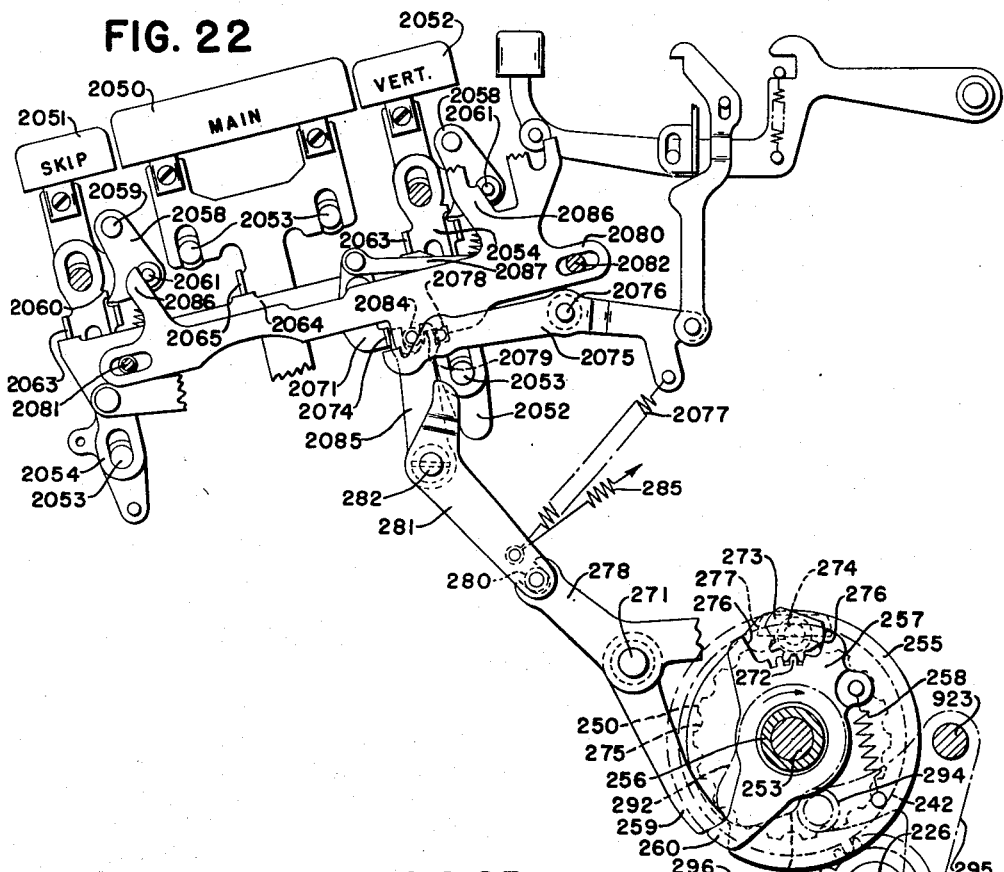
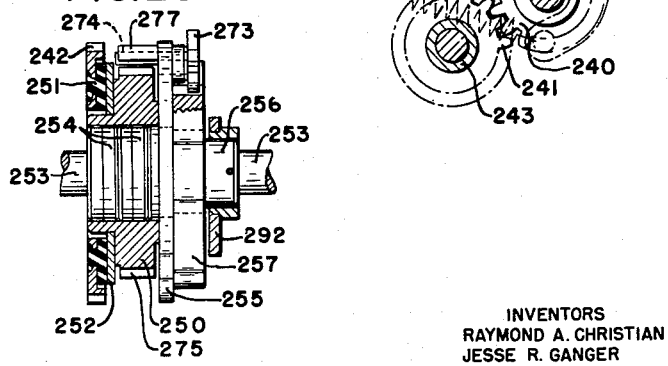
INVENTORS
RAYMOND A. CHRISTIAN
JESSE R. GANGER
JAMES H. CRAWFORD &
HERBERT C. JOHNSON
BY
THEIR ATTORNEYS

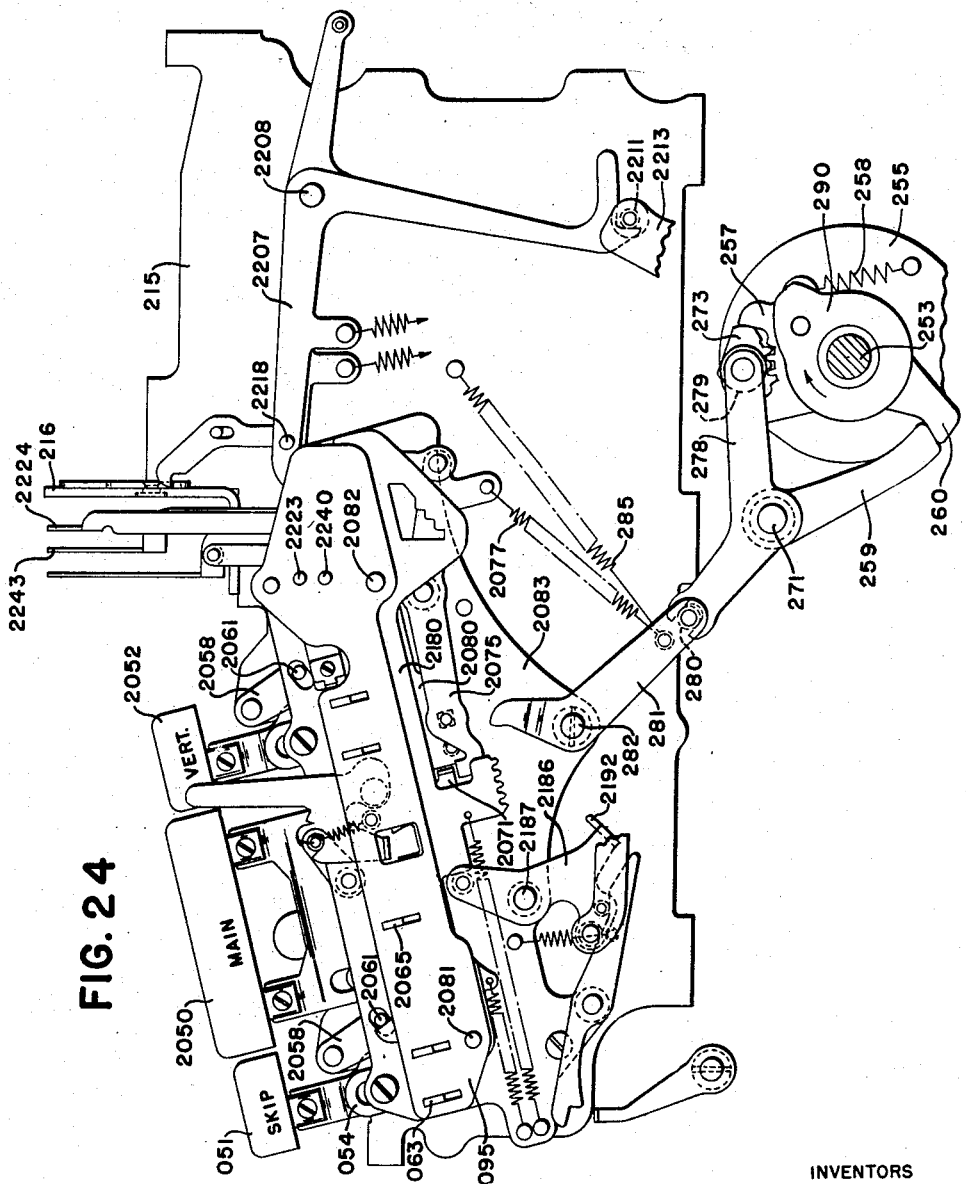

Jan. 19, 1954 R. A. CHRISTIAN ET AL 2,666,517
TABULATING MECHANISM FOR ACCOUNTING MACHINES
Original Filed Dec. 6, 1947 17 Sheets-Sheet 13
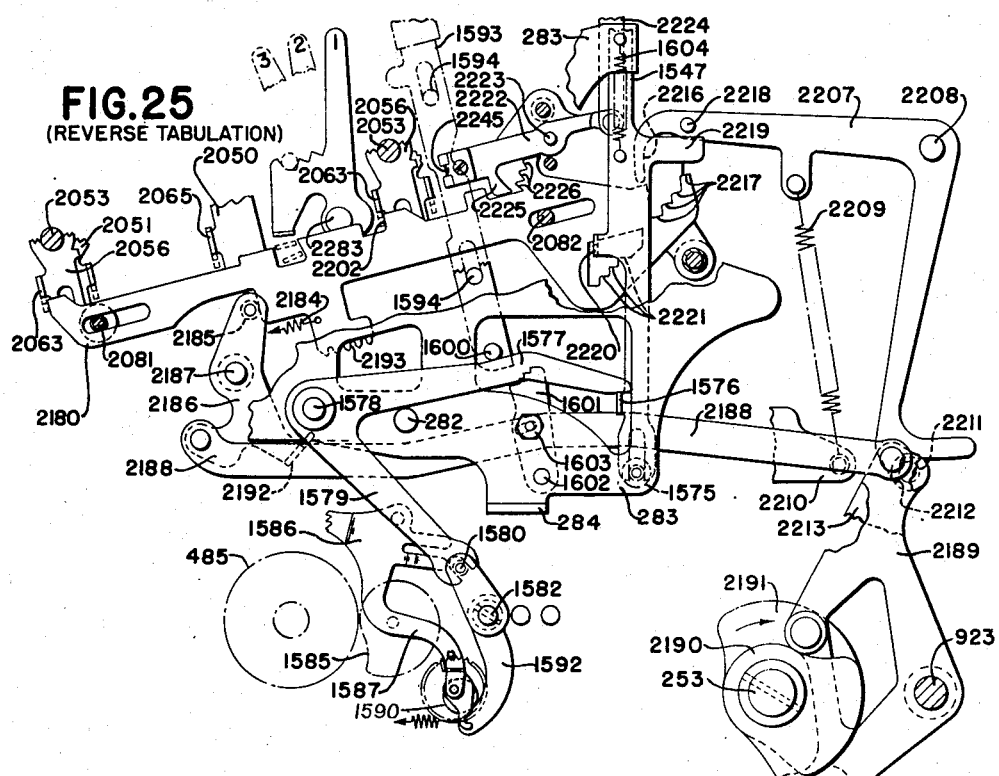
FIG. 25 (REVERSE TABULATION)
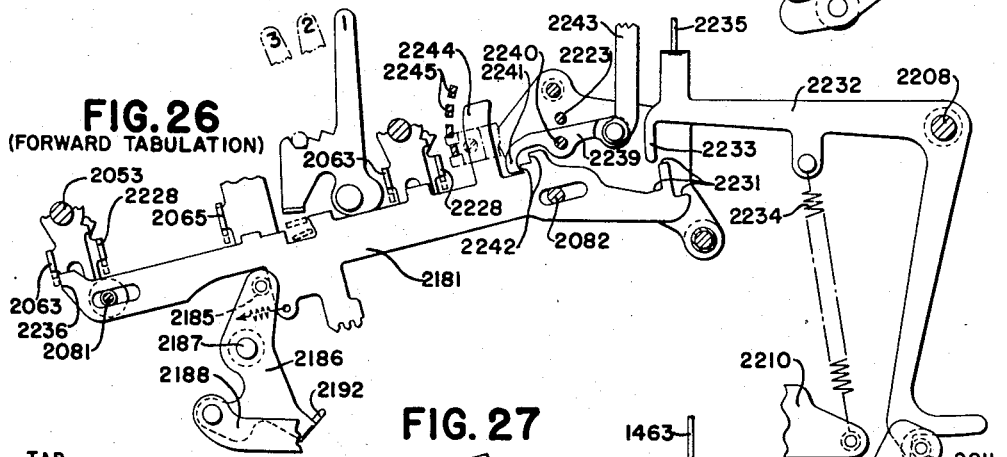
FIG. 26 (FORWARD TABULATION)
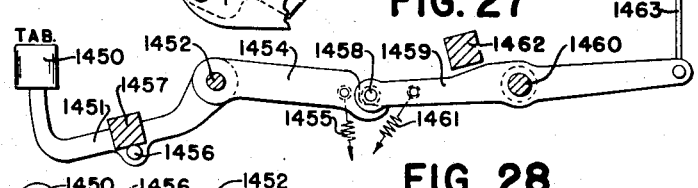
FIG. 27
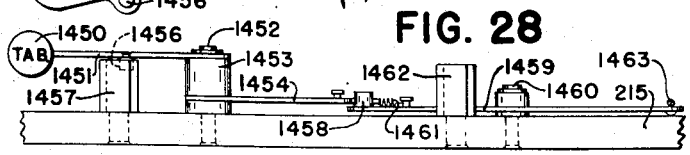
FIG. 28
INVENTORS
RAYMOND A. CHRISTIAN
JESSE R. GANGER
JAMES H. CRAWFORD &
HERBERT C. JOHNSON
BY
THEIR ATTORNEYS Jan. 19, 1954    R. A. CHRISTIAN ET AL    2,666,517
TABULATING MECHANISM FOR ACCOUNTING MACHINES
Original Filed Dec. 6, 1947    17 Sheets-Sheet 14
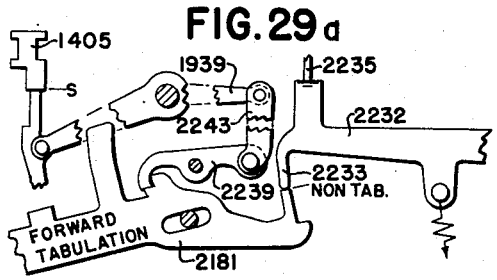
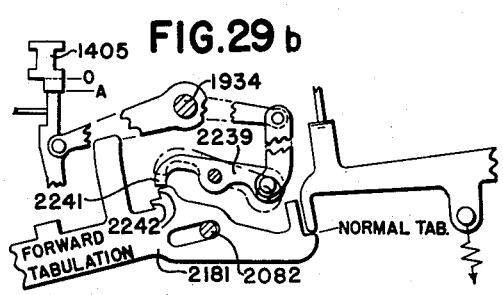
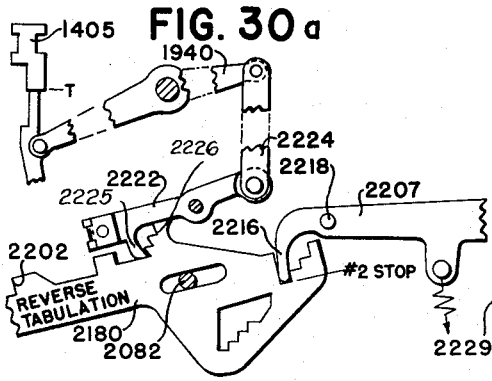
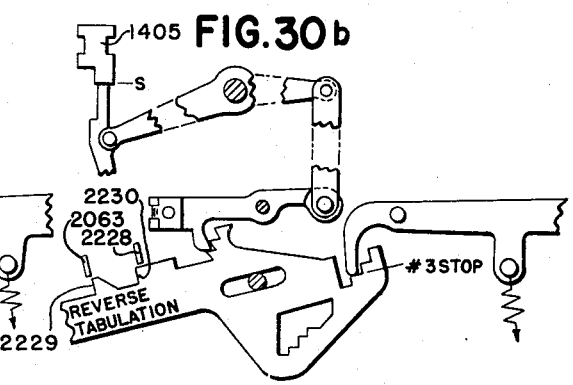
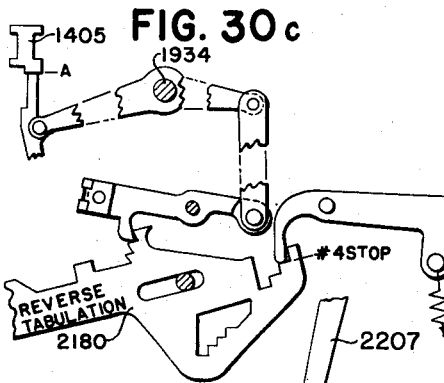
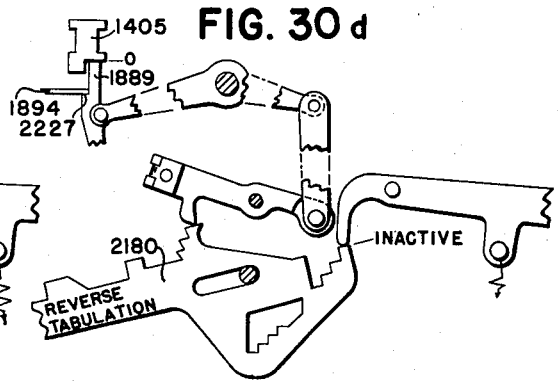
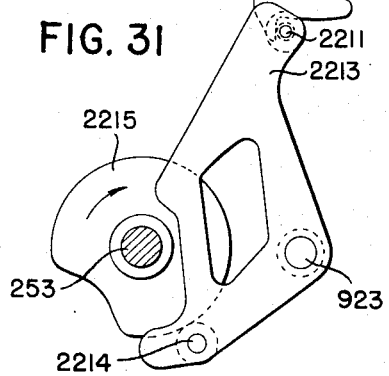
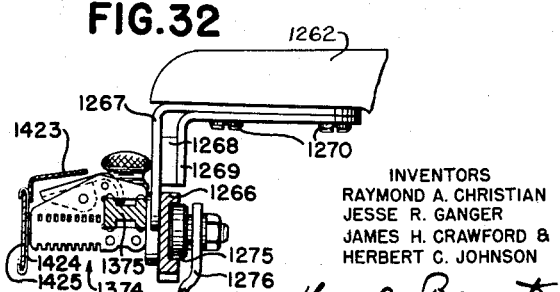
INVENTORS
RAYMOND A. CHRISTIAN
JESSE R. GANGER
JAMES H. CRAWFORD &
HERBERT C. JOHNSON
BY
THEIR ATTORNEYS Jan. 19, 1954  R. A. CHRISTIAN ET AL  2,666,517
TABULATING MECHANISM FOR ACCOUNTING MACHINES
Original Filed Dec. 6, 1947  17 Sheets-Sheet 15

INVENTORS
RAYMOND A. CHRISTIAN
JESSE R. GANGER
JAMES H. CRAWFORD &
HERBERT C. JOHNSON

BY

THEIR ATTORNEYS

Jan. 19, 1954    R. A. CHRISTIAN ET AL    2,666,517
TABULATING MECHANISM FOR ACCOUNTING MACHINES
Original Filed Dec. 6, 1947    17 Sheets-Sheet 16
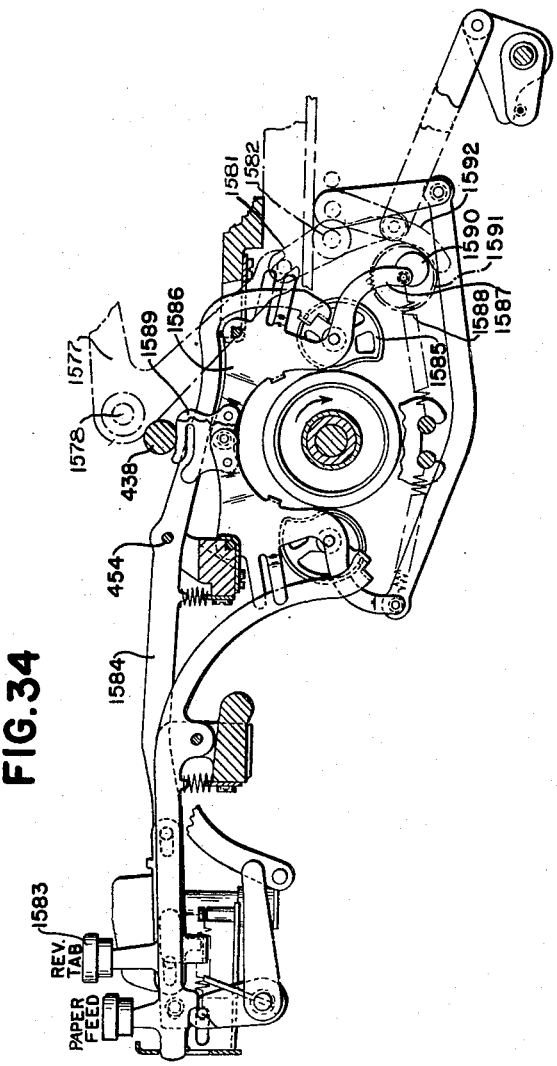
INVENTORS
RAYMOND A. CHRISTIAN
JESSE R. GANGER
JAMES H. CRAWFORD &
HERBERT C. JOHNSON
BY
THEIR ATTORNEYS

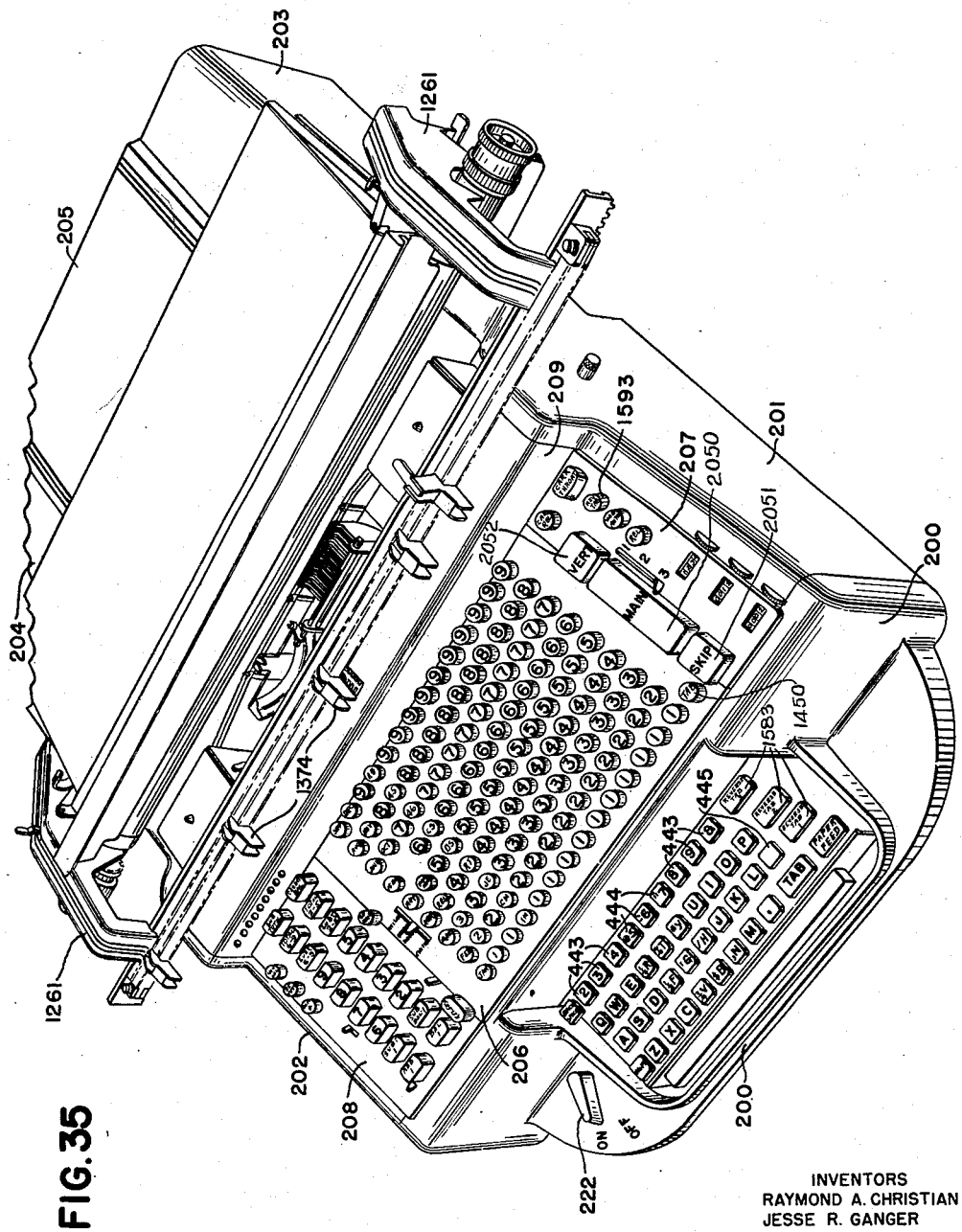

Patented Jan. 19, 1954

2,666,517

UNITED STATES PATENT OFFICE

2,666,517

TABULATING MECHANISM FOR ACCOUNTING MACHINES

Raymond A. Christian, Jesse R. Ganger, James H. Crawford and Herbert C. Johnson, Dayton, Ohio, assignors to The National Cash Register Company, Dayton, Ohio, a corporation of Maryland Original application December 6, 1947, Serial No. 790,032. Divided and this application November 16, 1950, Serial No. 195,982

22 Claims. (Cl. 197—177)

The present invention relates to calculating machines and particularly to machines of the accounting or bookkeeping type which are provided with a traveling paper carriage for supporting the bookkeeping forms and also for automatically controlling the various functions of the machine in accordance with the columnar positioning thereof.

This application is a division of the United States patent application of Rayond A. Christian et al., Serial No. 790,032, filed December 6, 1947, now Patent No. 2,626,749, issued January 27, 1953.

In the business world of today, there are nearly as many different types of bookkeeping systems employed as there are separate business organizations. It has, therefore, been necessary for the builders of bookkeeping or accounting machines to modify the designs of their machines frequently in order to adapt them to the particular bookkeeping system employed by the prospective purchaser. These so-called "customer order" machines are costly to build, since certain portions of the machine must be practically hand-made in order to furnish a machine having the desired characteristics. Accordingly, it is an object of the present invention to provide a solution to this problem of adapting a particular type of accounting machine to fit the bookkeeping system utilized by any particular customer. This has been done in the present instance by designing an accounting or bookkeeping machine which is sufficiently flexible in character that it may be used in connection with practically any of the complex accounting systems used by present-day business establishments.

Another problem confronting both the manufacturers and the users of accounting machines is the complexity of many of our present bookkeeping systems. Not only is it difficult to construct machines which are capable of performing the many and complicated operations involved, but it is also difficult for the operator of the machine to learn how to manipulate the various controls of the machine so as to properly perform the various operations involved in making an entry on the books. It is, therefore, a further object of the invention to provide a bookkeeping machine which will perform most of these operations automatically and therefore require a minimum amount of time and attention on the part of the operator of the machine.

A further object of the invention resides in the provision of a simplified type of front-feed paper carriage. This carriage is driven in both its forward direction and its reverse direction by a hydraulic drive mechanism which is operated by the same motor which serves to drive the main operating mechanism of the machine.

Another object of the invention resides in the provision of novel means for controlling the various functions of the machine either from the traveling paper carriage, from the several motor bars for initiating cycles of operation of the machine, or from certain of the manipulative keys situated on the keyboard of the machine.

A further object of the invention is to provide a plurality of slides operating under the control of various controlling devices for controlling certain functions of the machine. This control mechanism is designed in such a manner that any of the controlling devices may be arranged to stop any of the slides in any of their various positions, thereby affording the maximum amount of flexibility in the control of the machine by this mechanism.

Still a further object of the invention resides in the provision of an improved means for controlling the tabulating movements of the paper carriage, said means being under the control either of a group of manually-operable keys, of the several motor bars for initiating cycles of operation of the machine, or of the paper carriage itself.

Still another object of this invention resides in the provision of novel means for enabling the carriage to be selectively tabulated in either a forward direction or a reverse direction to various columnar positions and also in the provision of means for enabling the foregoing means to be controlled by the carriage.

With these and other objects in view which will become apparent from the following description, the invention includes certain novel features of design and combinations of parts, a preferred form or embodiment of which is hereinafter described with reference to the drawings which accompany and form a part of this specification.

In the drawings:

Figures 1–A and 1–B, taken together, constitute a longitudinal sectional view taken just to the right of one of the amount banks.

Figure 2 is a disassembled perspective view of one of the carriage stops used for controlling the various functions of the machine in accordance with the columnar position of the traveling paper carriage.

Figure 7 is a front view of the escapement mechanism for the traveling paper carriage.

Figure 8 is a front view showing the escapement mechanism more in detail.

Figure 9 is a front elevation showing some of the tabulating mechanism of the machine.

Figure 10 is a front view of the forward tabulating mechanism provided in the present machine.

Figure 11 is a front view which shows in particular the automatic cycling mechanism embodied in the present machine.

Figure 12 is a view showing a portion of the forward tabulating mechanism and also the means for controlling the operation of this mechanism from the "Skip" motor bar.

Figure 13 is a front view of the reverse tabulation mechanism incorporated in the present machine.

Figure 14 is a detail view of one of the carriage stops which is used to control the various functions of the machine.

Figure 16 is a plan view showing the sensing levers which cooperate with the carriage stops for the purpose of controlling the various machine functions.

Figure 17 is a front elevation of the mechanism shown in the preceding figure.

Figure 18 is a view showing a portion of the mechanism illustrated in the preceding figure.

Figure 19 is a view showing a portion of the mechanism illustrated in Figure 17.

Figure 20 is a left side view of certain parts of the automatic sensing mechanism.

Figure 21 is a right side elevation of the various motor bars and the cycle-initiating mechanism associated therewith.

Figure 22 is a right side view showing in further detail the construction of the cycle-initiating mechanism.

Figure 23 is a cross-section through the main clutch shown in Figure 22.

Figure 24 is a right side elevation showing the motor bars and the mechanism controlled thereby for controlling certain of the machine functions.

Figure 25 is a view illustrating in detail the control by the motor bars and also by the traveling paper carriage over the reverse tabulating control mechanism.

Figure 26 is a view which illustrates in detail the control by the motor bars and also by the traveling paper carriage over the forward tabulating control mechanism of the machine.

Figure 27 is a detail view of part of the "Tab" key mechanism associated with the adding machine mechanism.

Figure 28 is a plan view of the mechanism shown in the preceding figure.

Figures 29-a and 29-b are diagrammatic views showing the control by the traveling paper carriage over the forward tabulation slide.

Figures 30-a, 30-b, 30-c, and 30-d are diagrammatic views illustrating the control by the traveling paper carriage over the reverse tabulation slide.

Figure 31 is a right side view showing the means by which the motor bars and the traveling paper carriage control the paper-feeding mechanism of the machine.

Figure 32 is a fragmentary sectional view of the traveling carriage, showing how the carriage stops are assembled thereon.

Figure 33:
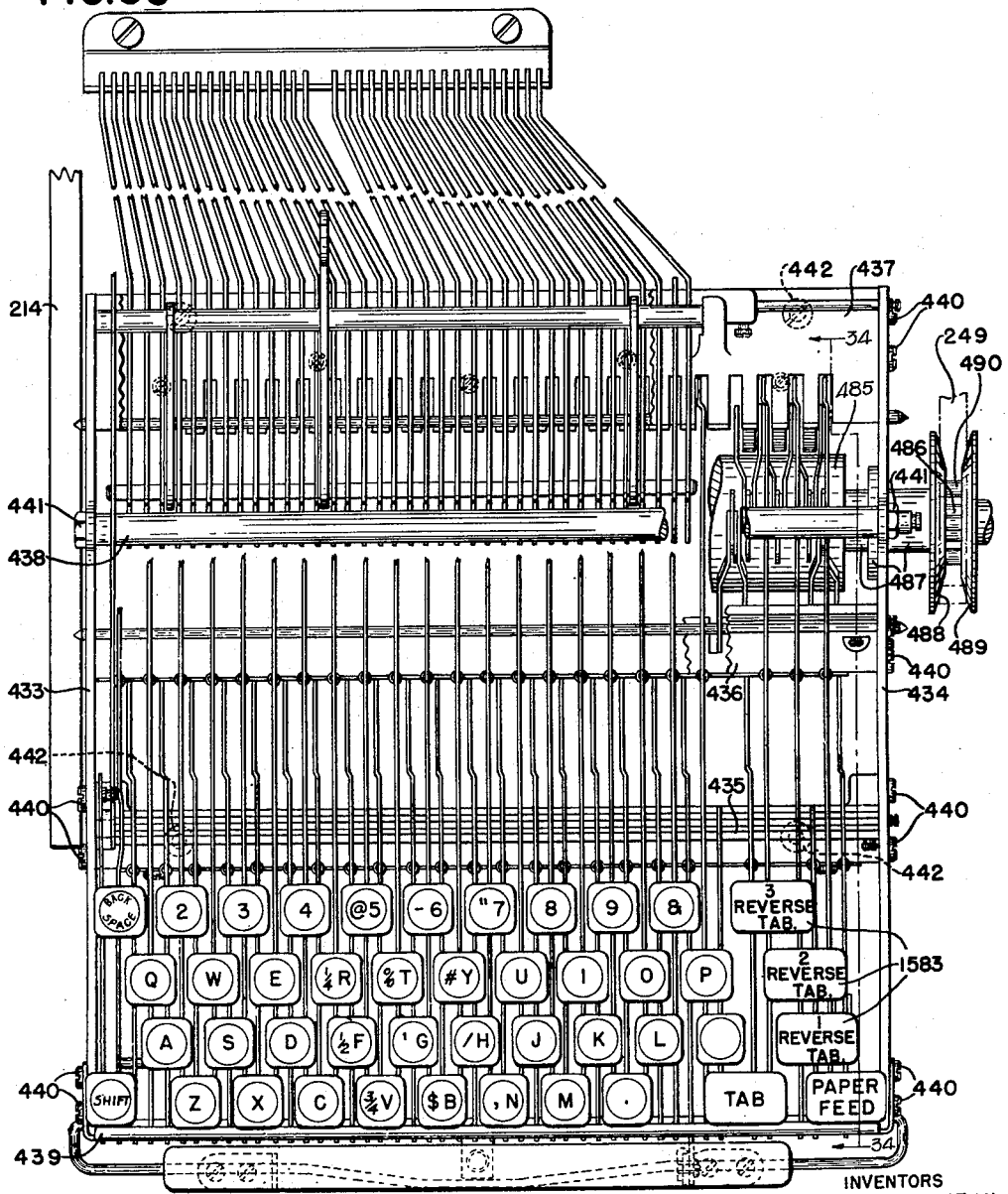

Figure 33 is a plan view of the automatic typewriter mechanism.

Figure 34 is a cross-sectional view taken along line 34—34, Fig. 33, showing a portion of the typewriter mechanism as viewed from the right of the machine.

Figure 35 is a perspective view of the complete machine.

1. General description

Certain of the principles and features of the machine to be described hereinafter are disclosed in the following United States patents: 1,197,276, September 5, 1916, Halcolm Ellis; 1,203,863, November 7, 1916, Halcolm Ellis; 1,819,084, August 18, 1931, Emil John Ens; 2,038,717, April 28, 1936, Raymond A. Christian; 2,079,355, May 4, 1937, Charles L. Lee; 2,181,975, December 5, 1939, Charles L. Lee; 2,189,851, February 13, 1940, Paul H. Williams et al.; 2,217,221, October 8, 1940, Jesse R. Ganger; 2,243,806, May 27, 1941, Laurence N. Lehman; 2,316,520, April 13, 1943, Henry F. Lang.

Reference is also made to application Serial No. 524,846, filed March 3, 1944, now Patent No. 2,442,402, issued June 1, 1948, to John T. Davidson et al., and entitled "Accounting Machines," for a further disclosure of certain of the features incorporated in the machine to be described hereinafter.

The basic structure of the present machine is patterned after the machine shown in the foregoing patents, which has been on the market for many years. For example, the construction and arrangement of the keyboard, the differential actuators, the printed, and the totalizers are practically identical with the corresponding mechanisms shown in the patents. The basic structure of the prior art machine is disclosed in the Ellis Patent No. 1,197,276, while an add-substract totalizer of the same general type as that used in the present machine is disclosed in Ellis Patent No. 1,203,863. The totalizer engaging and disengaging mechanism, on the other hand, is shown in the above-mentioned Patent No. 2,442,402. Most of the mechanisms for controlling the various machine functions, however, are new in the subject machine, as are also the paper carriage and the controlling mechanisms therefor. In addition, the instant machine is equipped with an electric typewriter, which is driven by the same motor that operates the remainder of the machine. With this brief over-all description in mind, the various parts of the machine will now be described in detail, so as to provide a full and complete understanding of the entire device.

2.—General organization and cabinet (Figure 35)

A perspective view of the machine as a whole is shown in Figure 35 of the drawings, and a general understanding of the layout and organization of the machine may be obtained from this illustration. As shown herein, a typewriter keyboard is located at the front end of the machine, while just behind and somewhat above this keyboard is an amount keyboard, on which may be set up the various amounts which are to be entered in the accounting machine. To the left of the amount keyboard is a control keyboard, containing the various function control keys, while to the right of it are located a plurality of motor bars and carriage control keys. In the center, just above the amount keyboard, are a group of type sectors for the accounting machine, while just to the left of these sectors is located a type basket for the electric typewriter. Immediately behind the aforementioned printing mechanism is a rotatable platen, in which accounting forms and/or other record material may be supported, this platen being mounted on a traveling carriage which is movable back and forth across the machine. Behind the paper carriage is shown that part of the machine cabinet which houses the add-subtract totalizers. At the front of the machine, just to the left of the typewriter keyboard, is a switch lever for starting and stopping a continuously-running electric motor, which drives the various operating mechanisms of the machine.

As shown in Figure 35, the operating mechanism of the machine is housed in a cabinet made up of several separate sections, each of which is independently removable in order to yield access to the part of the machine lying thereunder. This cabinet is composed of a front piece 200, extending across the front of the machine and having a central opening therein for accommodating the keys of the typewriter mechanism. Located on either side of the machine are side plates 201 and 202, immediately behind which are located additional side plates 203 and 204, which cover the sides and part of the top of the totalizer section of the machine. The top of the totalizer section is further covered by a plate 205, which also extends down over the rear end thereof and, together with similarly downwardly-extending portions on side pieces 203 and 204, serves to cover the rear of the machine.

The thus-constituted accounting machine cabinet is further complemented by keyboard cover plates 206, 207, and 208, which are provided with apertures through which extend the upper ends of barrel-type key caps. To the rear of the keyboard and extending across the machine between the side pieces 201 and 202 is an angular strip of metal 209, which encloses a carriage control mechanism which will be described in detail in a subsequent portion of this description.

*Framework (Figures 1-A and 1-B)*

The principal element of the machine frame is a cast iron base 213, which supports, either directly or indirectly, all of the various mechanisms going to make up the present machine. This base is generally rectangular in shape and is provided with various ribs, pads, bosses, and cutouts for accommodating all of the various structures supported thereon or depending therefrom. Mounted on top of the base toward the front of the machine are a left side frame 214 and a right side frame 215 (see Figures 1-A, 1-B, and 16). Extending between the upper portion of the side frames and connected thereto is an angle bar 216, which serves to support the forward part of the carriage as well as the carriage control mechanisms cooperating therewith. Located behind the angle bar 216 and supported by the side frames is a rail 217 for supporting the rearward portion of the carriage. The angle bar 216 is secured to the side frames 214 and 215 by screws 218, as shown in Figures 9 and 17, and the rail 217 is also secured to the side frames by screws (not shown). The base, the side frames, and the cross pieces for supporting the carriage constitute the main framework of the machine, although there are, of course, numerous sub-frames secured to these main frame elements for supporting the various operating mechanisms of the machine. These sub-frames will be described in connection with the mechanisms which they support as the description proceeds.

*Motor drive (Figures 3, 6, 22, 23, and 24)*

The various operating mechanisms of the present machine are driven by an electric motor 220 (Figures 3 and 6) secured to the under side of the base 213. As previously mentioned herein, the motor is adapted to operate continuously while the machine is in use and may be turned on or off by means of a single-pole, single-throw toggle switch 221 (Figure 6), which may be operated from the front of the machine by means of a lever 222 operably connected therewith. This mechanism will be described in greater detail later herein. A speed control device or governor (not shown) is provided on the rear end of the motor shaft for the purpose of maintaining the speed of the motor essentially constant under the varying load encountered in this type of service. On the front end of the motor shaft 223 (Figure 3) is secured a worm 224, which meshes with a worm wheel 225 pinned to a shaft 226, which is journaled at either end on bearings (not shown) provided in the side walls of a gear casing 227, which is secured by bolts 228 (only one shown) to the frame of the motor 220 and by other bolts 229 (only one shown in Figure 3) to the under side of the base 213. Hence, whenever the motor is running, the shaft 226 will be driven at a reduced rate of speed through the worm 224 and the worm wheel 225. Pinned to the right end of the shaft 226 is a spur gear 240 (Figures 3, 6, and 22), which meshes with two other spur gears 241 (Figure 6) and 242 (Figure 22). The gear 241 is secured to a sleeve 243, which is rotatably journaled on a long stud mounted in the right-hand side of the gear casing 227. Secured near the right-hand end of the sleeve 243 is a V-belt pulley indicated generally at 244 and consisting of a right-hand flange 245, which is rigidly secured to the sleeve 243, and a left-hand flange 246, which is constrained to rotate with the sleeve but is free for limited longitudinal movement thereon. A compression spring 247 surrounds the sleeve 243 and bears against the gear 241 on one end and the left-hand flange 246 on the other end so as to constantly tend to move the left-hand flange to its right-most position, thus tending to take up any play in a V-belt 249, which passes around the pulley 244 and serves to operate the power-driven roller 485 (Figure 1-A) of the electric typewriter. The sleeve 243 and the parts assembled thereon are retained on the long stud by means of a cap screw 248, which screws into a tapped hole in the end of the stud.

As previously mentioned, the gear 240 meshes with a gear 242, which is resiliently secured to a notched wheel 250 (Figures 22 and 23) by means of a rubber ring 251, which is bonded to the gear 242 and also to a metal ring 252, which is rigidly secured to the wheel 250. The wheel 250 is rotatably mounted on a main cam shaft 253 by means of roller bearings 254.

The gear 242 and the notched wheel 250 may be engaged with the main cam shaft 253 so as to cause the shaft to be given cycles of operation. The means for engaging the gear and the wheel with the shaft 253 comprises a disc 255 having a stepped hub 256, which is pinned to the shaft 253. Loosely mounted on the step of the hub 256 is a clutch control arm 257, which is urged clockwise on the hub 256 by means of a spring 258 connected between the arm and the disc 255. The arm 257 is normally prevented from rotation in a clockwise direction under the influence of the spring 258 by means of a tripping arm 259, the end of which cooperates with an extension 260 of the arm 257. The tripping arm 259 is secured to the left-hand end of a short shaft 271, which is rotatably mounted in the machine frame and may be caused to rotate clockwise, so as to release the arm 257 to the influence of the spring 258, under the control of the several motor bars of the machine and certain other machine operation control mechanisms to be described later herein.

The upper portion of the arm 257 is provided with gear teeth 272, which mesh with corresponding gear teeth formed on a headed portion 273 of a clutch dog 274 journaled in the disc 255 near its periphery. The dog 274 passes through the disc 255 and projects into the path of a series of notches 275 provided around the periphery of the wheel 250. The under side of the dog is flattened, so that it will clear the wheel and the notches when the dog is in the position shown in Figure 22. However, when the tripping arm 259 is moved away from the extension 260, the arm 257 will be rotated clockwise under the influence of the spring 258, and the dog 274 will be rotated counter-clockwise, so as to cause the left-hand edge of the stud to engage with one of the notches 275 of the constantly-rotating wheel 250, thereby causing the disc 255 and the main cam shaft 253 to be rotated clockwise, as viewed in Figure 22. The clutch control arm 257 is limited in its movement on the hub 256 by means of shoulders 276 provided on the arm 257, which shoulders cooperate with the sides of the headed portion 273 formed on the clutch dog 274. In order to brace the clutch dog 274, its upper half is surrounded by a bushing 277, which is secured to the disc 255.

Secured to the right-hand end of the shaft 271 is a two-armed lever 278 (see Figure 24), the rearwardly-extending arm of which is provided with a roll 279 and the forwardly-extending arm of which is bifurcated and engages with a stud 280 located in the lower end of a lever 281. The lever 281 is secured to the right-hand end of a shaft 282, journaled at one end in the side frame 215 and at the other end in a vertical bracket 283 (Figure 25), which is spaced to the right of the right side frame and secured to the machine base by means of screws passing through bent-over feet 284. The lever 281 and the shaft 282 are urged counter-clockwise by means of a spring 285 stretched between a stud in the lever 281 and a stud mounted in the side frame 215. Hence, the spring 285 constantly tends to move the tripping arm 259 clockwise out of engagement with the extension 260, so as to engage the clutch and cause the main cam shaft 253 to be rotated clockwise, as viewed from the right-hand side of the machine.

The main cam shaft 253 extends transversely across the machine beneath the base 213 (Figure 1-B) and is journaled at either end in roller bearings which are mounted in brackets (not shown) secured to the under side of the base by screws.

As shown in the drawings, the cam shaft 253 has secured thereto a large number of cams for controlling various functions in a manner to be more fully described later on herein. Secured to a sleeve near the right-hand end of the cam shaft is a tripping arm restoring cam 290, which normally rotates in unison with the cam shaft 253. As shown in Figure 24, the cam 290 is provided with a lobe which engages with the roll 279 on the lever 278 at the end of one revolution of the cam shaft to thereby rotate the shaft 271 counter-clockwise and move the tripping arm 259 back into the path of the extension 260 on the clutch control arm and so cause the clutch to be disengaged. The shaft 271 and the arm 259 are retained in their restored positions against the urgency of the spring 285, by means of a mechanism which will be described later on herein in connection with the motor bars of the machine.

In order to insure that the main cam shaft will complete its movement into its home position after the clutch has been disengaged, a homing cam 292 is secured to the cam shaft 253 (Figures 22 and 23) and is provided with a camming face 293, which cooperates with a roller 294 mounted on a pivoted lever 295, which is biased by a strong spring 296 in such a direction as to press the roller against the camming face 293 and thereby rotate the shaft 253 into its home position, as shown in Figure 22, where the roller seats itself in a slight depression formed in the face of the cam.

It will be noted from the foregoing description that the cam shaft 253 will be positively driven by the electric motor 220 through one revolution in a clockwise direction (as viewed from the right-hand side of the machine) each time the clutch is engaged.

*Hydraulic drive mechanism*
*(Figures 4, 5, 6, and 15)*

Figure 3:
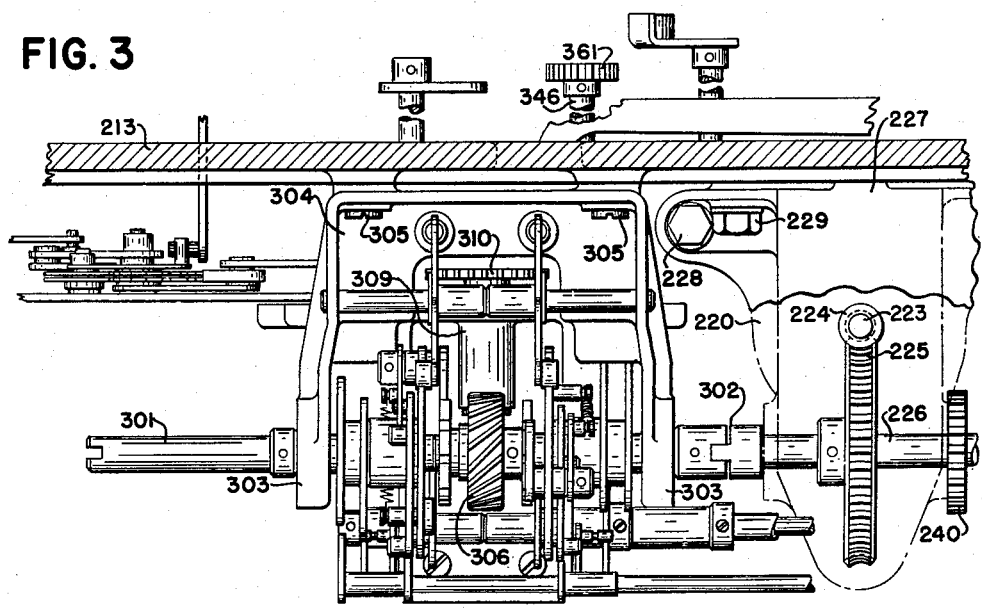
Figure 3 is a front view of a portion of the motor drive mechanism for the machine.
Figure 4:
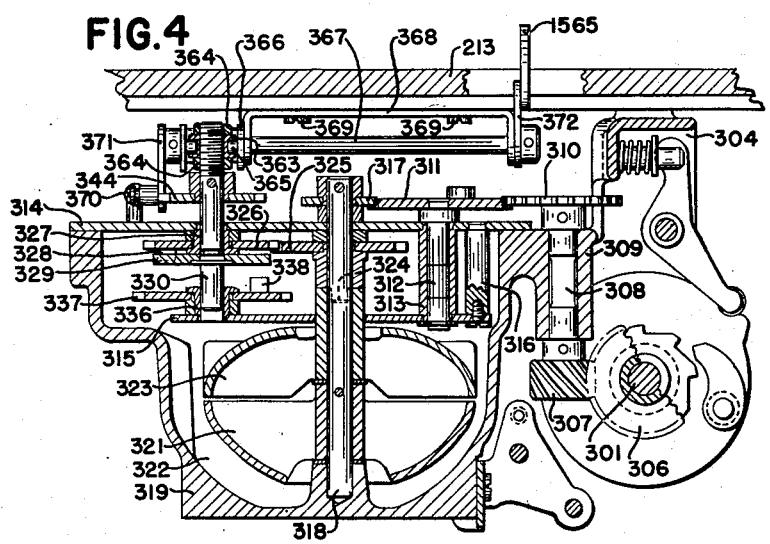
Figure 4 is a cross-section taken through the hydraulic coupling mechanism which drives the traveling paper carriage back and forth across the machine.

Referring now to Figures 3 and 4 of the drawings, a shaft 301 is coupled at 302 to the shaft 226 driven by the motor 220. The shaft 301 is journaled in a pair of downwardly-extending legs 303 of a casting 304 secured to the under side of the base 213 by means of screws 305. Located on the shaft 301 approximately midway between the legs 303 is a helical gear 306, which meshes with another helical gear 307 pinned to the lower end of a vertical shaft 308 journaled in a boss 309 formed integrally with the casting 304. Secured to the upper end of the shaft 308 is a spur gear 310, which meshes with a somewhat larger gear 311 secured to the upper end of a stub shaft 312. This shaft is journaled in a bushing 313, extending between a cover plate 314 for the hydraulic drive mechanism and an auxiliary plate 315, suspended from the cover plate 314 by means of hanger studs 316 (only one shown). Meshing with the gear 311 is a small gear 317, which is pinned to the upper end of a vertical shaft 318. This shaft is journaled at its upper end in the plate 314 and at its lower end in a hole formed in the bottom of a bowl-shaped casing 319, which is cast integrally with the casting 304. Further support for the casing 319 is provided by a suspension stud 320 (Figure 6) attached to the base 213.

As shown in Figure 4, the lower end of the shaft 318 is pinned to an impeller 321, which is completely submerged in a body of oil 322 contained in the casing 319. Located directly above the impeller 321 and also completely submerged in the oil 322 is a runner 323, which is freely rotatable on the shaft 318. The runner 323 is coupled by means of clutch cuts 324 to the hub of a gear 325 rotatably mounted on the shaft 318 so as to cause the gear to rotate in unison with the runner. Meshing with the gear 325 is a spur gear 326 rotatably mounted on a bushing 327 secured to the cover plate 314. Secured to the face of the gear 326 and projecting downwardly therefrom is a pin 328, which is adapted to cooperate with a coupler 329 secured to a short vertical shaft 330, which is journaled in the bushing 327 and also in a bushing 336 mounted in the plate 315. Rotatably mounted on the outside of the bushing 336 is a gear 337, having an upstanding pin 338 mounted on its upper face for cooperation with the coupler 329.

Figure 5:
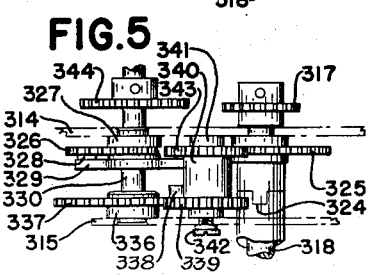
Figure 5 is a fragmentary view of the mechanism used for reversing the direction of the drive to the carriage.
Figure 6:
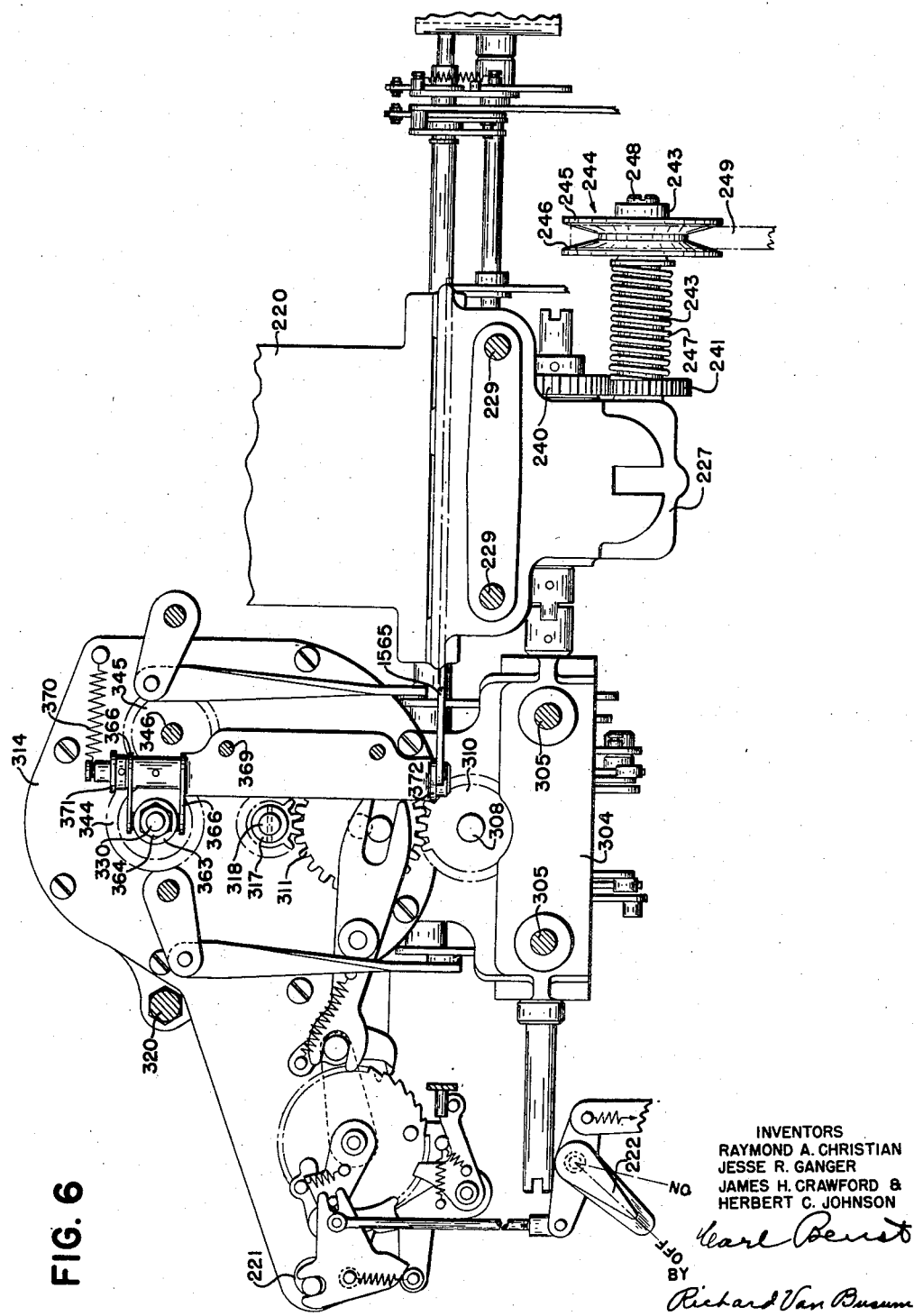
Figure 6 is a plan view of the motor drive mechanism and the hydraulic coupling device.

Referring now to Figure 5, meshing with the gear 337 is a gear 339 secured to a hub 340. This hub is rotatably mounted on a stud 341, which extends between the plates 314 and 315 and is secured to the plate 315 by means of a screw 342. Secured to the upper end of the hub 340 is a gear 343, which meshes with the gear 325, which, it will be recalled, is operably connected with the runner 323.

From the foregoing description it will be observed that the gear 326 is driven directly by the gear 325, whereas the gear 337 is driven through the idler gears 339 and 343, thereby causing the gear 337 to be driven in an opposite direction from gear 326. Thus, by shifting the coupler 329 up and down so as to engage either the pin 328 or 338, the direction of rotation of the shaft 330 may be reversed. It should also be noted that the shaft 330 does not receive a positive drive from the electric motor 220 but instead is yieldingly driven through the hydraulic or fluid clutch mechanism consisting of the impeller 321 and the runner 323.

Pinned to the shaft 330 above the cover plate 314 is a spur gear 344, which meshes with a broad-faced spur gear 345 (see Figure 15) secured to the lower end of a vertical shaft 346. The shaft 346 is journaled at its lower end in a bushing 350 secured in the cover plate 314, while the upper end of the shaft is journaled in a bushing 347 secured to a bracket 348. The bracket 348 is secured to the rail 217 extending between the side frames 214 and 215 by means of screws 349. Secured to the upper end of the shaft 346 is a spur gear 361, which, as shown in Figure 1-B of the drawings, meshes with a rack 362 secured to the paper carriage of the machine.

Figure 15:
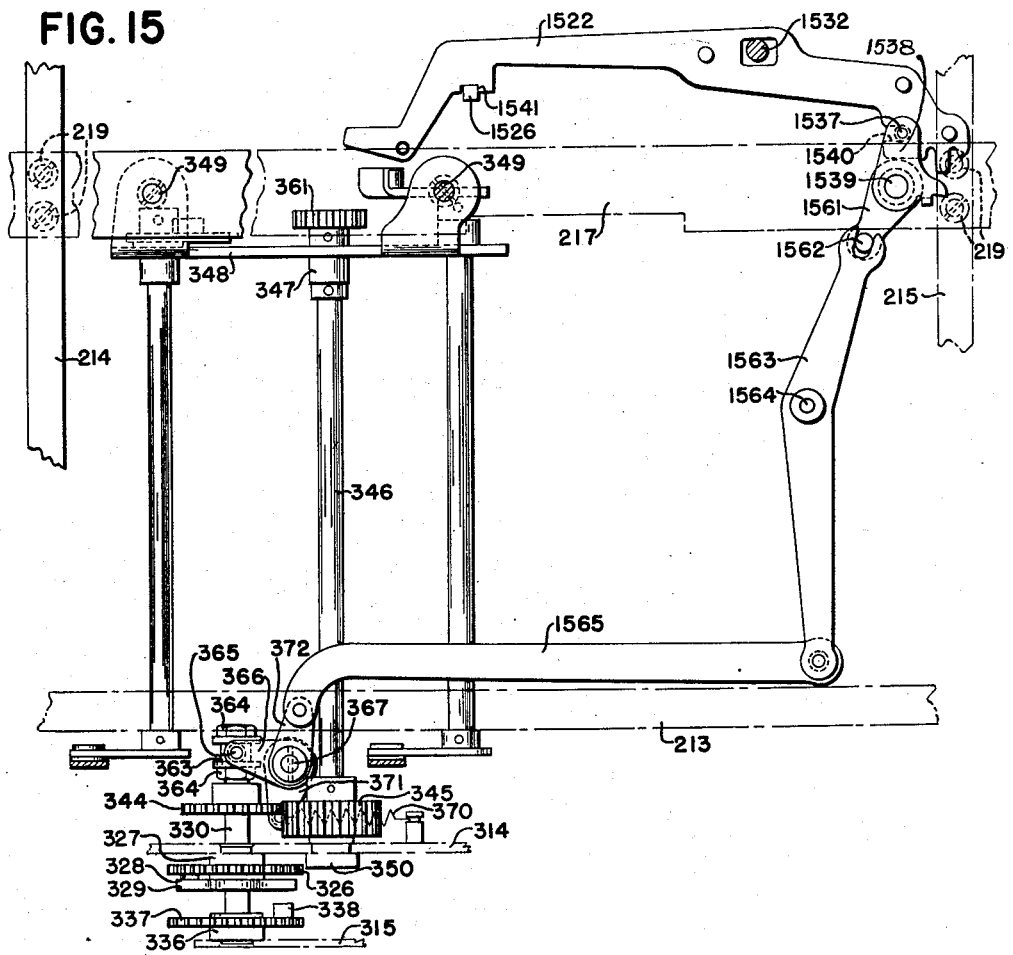
Figure 15 is a front view showing the operative connections between the reverse tabulation mechanism and the reversing means for the hydraulic drive mechanism.

The shaft 330 and the coupler 329 may be shifted up and down so as to reverse the direction of rotation of the gear 361 and the direction of travel of the paper carriage by means of a grooved collar 363 (Figures 4 and 15), which is held in place on the upper end of the shaft 330 by means of two nuts 364 located above and below the collar 363 on a threaded portion of the shaft 330. Located on opposite sides of the collar 363 and projecting into the groove therein are pins 365 mounted in shifter arms 366 secured to a horizontal shaft 367. This shaft is journaled in a bracket 368, which is secured to the under side of the base 213 by means of screws 369. The shaft 367 is urged counter-clockwise, as viewed in Figure 15, by a spring 370, stretched between a stud located in the end of an arm 371 secured on the rear end of the shaft 367 (Figures 4 and 6) and a stud secured to the cover plate 314 (Figure 15). Secured to the forward end of the shaft 367 is an arm 372, which is connected with a reverse tabulation mechanism in a manner which will be fully described later herein.

When the coupler 329 is in its raised position, as shown in Figures 4 and 5, the paper carriage will be yieldingly urged in a forward tabulating direction, or to the left as viewed from the front of the machine, whereas, when the coupler is lowered into a position to cooperate with the pin 338, the paper carriage will be yieldingly urged in a reverse tabulating direction, or to the right.

*Electric or automatic typewriter (Figures 1-A, 1-B, 33, and 34)*

The typewriter mechanism utilized in the present machine is of the same general type as that disclosed in the United States patent to James F. Smathers, No. 1,600,252, issued September 21, 1926, wherein each type bar is actuated by a power unit comprising a cam rotatably mounted on a bell crank lever and arranged for rolling engagement with a constantly-rotating roller. As shown in Figures 1-A, 1-B, and 33, the typewriter mechanism is supported between two side frames, a left side frame 433 and a right side frame 434, which frames are joined to one another by means of cross bars 435, 436, and 437, a tie rod 438, and a key lever guide plate 439. The cross bars 435, 436, and 437 and the guide plate 439 are secured at either end to the side frames by means of screws 440, while the tie rod 438 is secured thereto by means of nuts 441. The resulting framework is secured to the base 213 of the machine by means of four screws 442, thereby securing the typewriter frame to the accounting machine frame, with the typewriter left side frame 433 located just to the right of the accounting machine left side frame 214.

The keyboard arrangement of the typewriter is shown in Figure 33, it being observed that thirty-six character keys are provided, which are arranged in the customary and conventional manner. It is further to be observed that the keys may be divided into two groups, those numbered 443, which bear a single character, and those numbered 444, which bear two characters. There are twelve of the latter types of keys, these being assembled in a group near the center of the keyboard. Each of the printing type connected with the latter keys is inscribed with two characters, provision being made for shifting these types so as to enable one or the other of the characters inscribed thereon to be selected for printing. A dummy key 445 is located at the right-hand end of the second row of keys from the bottom, this key being arranged to be non-depressible and serving merely as a rest for the little finger of the operator.

Supported between the downward extensions 482 of the side frames is the rotatable driving roller 485, secured to a shaft 486, which is rotatably supported at either end by bushings 487 (Figures 6, 33, and 34) mounted in the extensions 482. Secured to the right-hand end of the shaft 486 is a V-belt pulley adapted to be driven by the V-belt 249. This pulley has an inner flange 488, which is secured to said shaft, and an outer flange 489, which is capable of sliding movement on pins 490 secured to the inner flange 488. The outer flange 489 is thus capable of being moved along the shaft 486 either toward or away from the inner flange 488 but still will be drivingly connected to the shaft 486 by means of the pins 490. The location of the outer flange 489 with respect to the inner flange 488 may be adjusted and maintained by means of a pair of lock nuts (not shown), which are screwed onto a threaded extension of the shaft 486. The V-belt 249 (Figures 6 and 33) is passed around the pulley 488–489 and will enable the driving pulley 244 to drive it clockwise, as viewed from the right-hand side of the machine and as indicated by the arrow in Figure 34. The speed of operation of the roller 485 may be adjusted by moving the outer flange 489 of the pulley either toward or away from the inner flange 488, so as to increase or decrease the effective diameter of this pulley. Any slack in the V-belt 249 will be taken up by the automatic take-up feature provided in connection with the driving pulley 244 (Figure 6), as previously described herein.

The details of the automatic typewriter are well known in the art, and therefore the parts thereof not pertinent to the present invention will be but briefly described herein, as reference may be had to the Patent No. 1,600,252 if a more detailed description is desired.

Each of the keys 443 and 444 has the usual actuating cam (not shown), which cooperates with the roller 485, and depression of any one of said keys releases the corresponding actuating cam for engagement with said roller. The roller immediately picks up the released cam and carries it and the corresponding hanger and type lever in unison therewith to type a character representative of the depressed key on the record material supported by the platen roll 539, which is in turn supported by the above-mentioned traveling carriage.

*Traveling paper carriage (Figures 1–B, 9, 10, and 32)*

As shown in Figure 1–B, the traveling paper carriage consists of a framework which includes a pair of end housings indicated generally at 1261, each housing being formed of an inner casting 1262 and a similar outer casting. The housings 1261 are supported in their spaced positions by a Z-bar 1264, an L-bar 1265, and an I-bar 1266, to which the inner and outer castings are secured by means of screws or other suitable fastening means.

The Z-bar and the L-bar are secured directly to the end housings, whereas the I-bar 1266 is secured at either end to a bracket 1267, which is bonded to a block of rubber 1268, which is in turn bonded to a second bracket 1269, secured by screws to the end housing. Freedom of movement between the bracket 1267 and the bracket 1269 is provided by means of transversely elongated holes formed in the bracket 1267, within which are located spacing collars (not shown), which are made of slightly thicker material than the bracket 1267 and on which the bracket 1269 is securely clamped by means of the screws 1270. The I-bar is thus free to move against the resilience of the rubber block 1268 in a direction along the length of the rail but is prevented from moving relatively to the carriage frame in a vertical direction.

The thus-constituted carriage frame is supported for transverse sliding movement on the accounting machine frame by means of a tube 1271, secured to the under side of the L-bar 1265, which tube cooperates with a series of grooved rollers 1272, which are rotatably secured to the rail 217. The tube 1271 also cooperates with a series of conical rolls 1273 located on either side of the tube, those located on the forward side of the tube being mounted on the rail 217 and those located to the rear of the tube being mounted on posts 1274, secured to the rear side of the rail 217. The forward portion of the carriage is supported on rolls 1275, which are received within a groove formed in the I-bar 1266. As shown in Figures 1–B and 9, the rolls 1275 are rotatably mounted on a vertical frame plate 1276, which is secured to the vertical portion of the angle bar 216 by mounting posts 1277 (only one shown) and studs 1278, 1279, and 1280 (Figure 10).

The carriage is yieldably driven in either direction across the machine by the gear 361 (see Figure 1–B), which meshes with the rack 362, secured by screws or other fastening means to the Z-bar 1264. Also secured to either end of the rack are a pair of limit stops (not shown), which cooperate with an upturned ear 1282, formed on the bracket 348 so as to limit the lateral travel of the carriage and prevent it from moving off the ends of the guide rails. As previously described herein in connection with Figures 3, 4, and 6, the gear 361 is arranged to be rotated in either direction by means of a hydraulic drive mechanism driven by the electric motor 220. Hence, whenever the motor is operating, the carriage will be resiliently urged to move in either a left-hand direction or a right-hand direction across the machine.

*Carriage escapement mechanism (Figures 7 and 8)*

The letter-spacing and tabulating movements of the carriage are controlled by an escapement mechanism composed of a pair of escapement pawls 1283 and 1284 (see Figures 7 and 8) provided with teeth 1285 and 1286, respectively, which are adapted to engage with rack teeth 1291 provided along the lower edge of the I-bar 1266. The escapement pawls are pivotally supported on the frame stud 1279 and are resiliently urged toward the right, as viewed in Figures 7 and 8, and also counter-clockwise about the stud by means of springs 1292 (only one shown), which are stretched between the pawls 1283 and 1284 and a pair of rebound pawls 1293 and 1294, which are pivotally mounted on the frame stud 1278. The holes in the escapement pawls for accommodating the stud 1279 are slightly elongated, so as to permit the pawls to be moved through a distance equal to approximately one-half of a letter space in a direction corresponding to the length of the I-bar 1266.

The teeth 1285 and 1286 of the escapement pawls are adapted to be alternately engaged with the teeth 1291 to thereby permit step-by-step letter-spacing movement of the traveling carriage. As shown in Figure 7, the tooth 1285 of the front pawl 1283 is in engagement with one of the rack teeth 1291, and the pawl is in its leftmost position on the stud 1279, the pawl having been moved to this position against the urgency of its spring 1292 by means of the hydraulic drive mechanism for the carriage. This mechanism normally urges the carriage to move in its forward direction or in the direction of the arrow 1295 with sufficient force to overcome the force of the spring 1292. At this time, the escapement pawl 1284 will be pulled toward the right by the spring 1292 and will be located with its tooth 1286 resting on top of one of the teeth 1291. When the pawl 1283 is disengaged from the rack teeth 1291 in a manner to be described hereinafter, the tooth 1286 on the pawl 1284 will engage with the rack teeth and will thereby be forced toward the left against the urgency of its spring 1292. As a result, the traveling carriage will be permitted to escape one letter space toward the left or in the forward direction. The pawl 1283 will, when disengaged from the rack teeth, be moved toward the right by its spring 1292 so as to occupy a position like that shown in Figure 8, where its tooth 1285 rests on top of one of the rack teeth 1291. In order to move the paper carriage one more letter space in the forward direction, the pawl 1284 must be disengaged from the rack teeth so as to permit the carriage to escape until the tooth 1285 is engaged against one of the rack teeth and the elongated hole therein is engaged against the right-hand side of the stud 1279.

Rebound pawls 1293 and 1294 are provided for the purpose of preventing the carriage from rebounding when it is stopped by the engagement of one of the teeth 1285 or 1286 with the rack teeth 1291. The problem of carriage rebound is not so important in connection with the letterspacing movement of the carriage, but it is apt to present somewhat of a problem in the case of the tabulating movement of the carriage from one column to another when the machine is performing its accounting machine functions. The springs 1292 urge teeth on the rebound pawls (similar to the teeth 1285 and 1286) into engagement with the rack teeth 1291. The rebound pawls are provided with shoulders 1296 and 1297, which lie beneath the right-hand ends of their associated escapement pawls and are urged into engagement therewith by the springs 1292. As shown in Figures 7 and 8, the design of this mechanism is such that, whenever a tooth on one of the escapement pawls is engaged with the rack teeth, the tooth of its associated rebound pawl 1293 will likewise be engaged therewith. However, when one of the escapement pawls is moved out of engagement with the teeth 1291, the associated rebound pawl 1293 or 1294 will likewise be moved out of engagement therewith. Hence, whenever movement of the carriage is arrested by the engagement of an escapement pawl with the rack teeth, the tooth of the rebound pawl connected therewith will likewise engage with the rack teeth and thereby prevent any rebounding of the carriage. Also, whenever one of the escapement pawls is disengaged from the rack teeth, the rebound pawl associated therewith will likewise be carried out of engagement with the teeth so as not to interfere with the free movement of the carriage under the control of the escapement pawls.

*Carriage stops (Figures 2, 14, and 32)*

In order to control the tabulating movement of the traveling paper carriage back and forth across the machine and also to enable the carriage to control the various functions of the accounting machine, a series of carriage stops 1374 (Figures 12 and 13) are removably secured to an I-shaped stop bar 1375 carried by the traveling carriage. The constructional details of the carriage stops are shown in Figures 2 and 14 of the drawings, it being noted that each of the stops is provided with a stop block 1382, which is a machined block of metal having two downwardly-extending projections 1381 and 1383, the projection 1381 constituting a forward tabulation stop and the projection 1383 constituting a motor-bar-enabling lug. The block 1382 is provided on its underneath side with a transverse groove 1384 for receiving a reverse tabulation stop 1385 (see also Figure 13), which is provided with a cylindrical tenon 1386, which is adapted to be received within a hole 1387 bored vertically through the block 1382 and riveted over at its upper end so as to fasten the stop 1385 securely to the block. As shown in Figure 2, the projection 1381 is provided with a horizontally-extending hole 1388, which is adapted to receive a pin 1389 (Figure 14) formed on the side of an automatic cycling lug 1390 (see also Figure 11), the end of the pin being riveted over so as to securely fasten the lug to the block 1382. As shown in Figure 12, the forward tabulation stops are provided in three different lengths; a short or "normal-tab" stop 1381; an intermediate or "skip-tab" stop 1392; and a long or "hold-skip-tab" stop 1393. Similarly, the stops for controlling the tabulating movements of the carriage in the reverse direction are provided in different lengths, as shown in Figure 13, the shortest stop 1385 being known as the No. 1 reverse tabulation stop, while the other three stops—1396, 1397, and 1398—are known as the No. 2, No. 3, and No. 4 reverse tabulation stops.

Each stop block 1382 is provided with a pair of transverse holes 1399 (Figure 2) for enabling a pair of side plates 1400 to be secured thereto. The method of fastening the plates to the block may either take the form of rivets where a permanent type of construction is desired, or screws 1401 (Figure 14) may be used where a temporary set-up is desired. Each of the side plates 1400 is provided with apertures 1402 and notches 1403, which are adapted to receive lugs 1404 formed on the sides of function control plates 1405, the purpose of which will be described in greater detail later on herein.

Each of the side plates 1400 is provided with a cut-out 1411 for enabling the stops 1374 to be pushed onto the stop bar 1375, which is provided along its entire length with a series of notches 1412 for receiving the side plates. The bar 1375 is provided at either end with tenons 1413 (Figure 7), which are received within brackets 1414 mounted near either end of the I-bar 1266, where they are held by means of retaining pins 1415.

As shown in Figure 14, each stop 1374 is adapted to be retained on the bar 1375 by means of a latch 1417, which is pivoted to the side plates of the stop at 1418 and is provided with a hook portion 1419, which is urged into engagement with the flanged portion of the bar by means of a torsion spring 1420. A card-holding element 1421 is secured to the top portion of the latch and is adapted to receive and retain therein a card 1422 bearing printed information identifying the stop to which it is secured.

*Forward tabulation control mechanism (Figures 7, 12, 27, and 28)*

In order to enable the present machine to perform its bookkeeping functions, means is provided for enabling the traveling carriage to be tabulated from one columnar position to another while traveling in either its forward direction or its reverse direction, so as to enable the amounts set up on the keyboard to be printed in the proper columns of the bookkeeping form. The tabulation control mechanism utilized in the present machine is extremely flexible in character and may be controlled either from special keys, from the motor bars, or from the traveling carriage itself.

As illustrated in Figure 12, the mechanism for controlling the tabulating movements of the carriage in the forward direction comprises a tabulation stop arm 1426, which is provided with an abutment face 1427, which is adapted to cooperate with the forward tabulation stop formed on the stop block 1382. The tabulation or "tab" stop arm 1426 is pivotally mounted on a stud 1428 secured to a forward tabulation lever 1429, which lies just behind the angle bar 216 and is supported on the frame stud 1280 by means of an elongated slot 1430. The lever 1429 is urged toward the right, as viewed in Figures 11 and 12, by a spring 1431, and to rotate clockwise about the stud 1280 by a spring 1436 (Figure 10). The action of these springs is resisted by a square stud 1432, which lies beneath the right-hand end of the lever 1429 and which is secured to the rear face of the angle bar 216. The stud cooperates with a shoulder 1433, formed on the lever 1429, and prevents the lever from being moved toward the right or being rotated under the influence of the springs 1431 and 1436.

Also pivotally mounted on the stud 1428 between the lever 1429 and the arm 1426 is a tab stop setting arm 1434, which is urged clockwise thereabout by means of a spring 1435, so as to cause the bottom edge of this arm to bear against the square stud 1432. The tab stop arm 1426 carries a stud 1441, which is urged into contact with the lower edge of the setting arm 1434 by means of a spring 1442, which is stretched between downwardly-extending tabs formed on the arms 1426 and 1434. The right-hand end of the setting arm 1434 is provided with a pair of notches 1443 and 1444, which are adapted to cooperate with a pawl 1445 (Figure 10), which is pivotally mounted on a stud 1446, secured to the angle bar 216. The upper end of the pawl 1445 is normally urged toward the notches by means of a spring 1447 but, in the normal position of the parts, as shown in Figure 10, is prevented from engaging therewith by means of a triangular plate 1448, secured to the right-hand end of the lever 1429, which bears against an arm 1449, provided on the pawl 1445.

When the tab stop arm 1426 is in the position shown in Figure 10, the abutment face 1427 lies out of the path of the tab stops 1381, 1392, and 1393 (see also Figure 12). The tab stop arm, however, may be moved from this "home" position into any one of three raised positions, as shown by the dot-and-dash lines in Figure 12. When the arm is moved to its highest or "normal tab" position, it will lie in the path of travel of any of the stops 1381, 1392, or 1393. When it is moved to its next-to-highest or "skip-tab" position, it will lie in the path of the tab stops 1392 and 1393 but will be out of the path of the stop 1381. When the arm is in its lowest active position, it will be set for what is known as a "hold skip-tab" operation and will cooperate only with the tab stop 1393 and will pass freely beneath the stops 1381 and 1392. In the present embodiment of the invention shown in the accompanying drawings, the tab stop arm can only be moved to its lowest or "hold skip tab" position under the control of the "skip" motor bar, as will be described later in connection with a description of this motor bar.

As previously mentioned, the tab stop arm may be set to these positions either under the control of a tab key, under the control of the motor bars, or by the traveling paper carriage itself. The means for setting the tab stop arm under the control of the tab key will now be described, the means for setting this arm under the control of the motor bars and the traveling paper carriage being explained in a subsequent portion of this specification.

As shown in Figures 27 and 28, a "tab" key 1450 is mounted on the end of a key lever 1451, which is pivoted on a stud 1452 mounted on the right side frame 215. Secured to the key lever 1451 by a hub 1453 is an arm 1454, which is urged to rotate clockwise by a spring 1455. This will cause the key 1450 to be maintained in an elevated position, with a stud 1456 mounted on the key lever held against the under side of a block 1457 secured to the right side frame. The rear end of the arm 1454 is adapted to cooperate with a stud 1458 mounted on the forward end of a lever 1459, which is pivotally mounted on a stud 1460 secured to the side frame 215. The lever 1459 is urged counter-clockwise by a spring 1461, so as to assist the spring 1455 in urging the stud 1456 against the block 1457. Rotation of the lever 1459 in a clockwise direction is limited by a block 1462, secured to the right side frame, thereby limiting the extent to which the "tab" key 1450 may be depressed.

Secured to the rear end of the lever 1459 is the lower end of a wire link 1463, the upper end of which (Figure 10) is provided with a clevis by means of which the link is pivotally connected to a lifting lever 1464, pivotally mounted on the stud 1371. A lifting dog 1471 is pivoted to the left-hand end of the lifting lever at 1472 and is urged clockwise by means of a spring 1473. Movement of the dog under the influence of the spring is limited by the engagement of a projection formed thereon with a stud 1474 mounted on the lever 1464. The upper end of the dog lies beneath a lug 1475 formed on the stop setting arm 1434 (see also Figure 12) and also beneath a lug 1476, formed on the lever 1429 (see also Figure 11). Consequently, when the "tab" key 1450 is depressed so as to cause the wire 1463 to be pulled down, the dog 1471 will be lifted and engaged with the lugs 1475 and 1476 to thereby elevate the arm 1434 and the right-hand end of the lever 1429. This will cause the shoulder 1433 to become disengaged from the square stud 1432 and permit the lever 1429 to escape to the right under the influence of the spring 1431, so as to bring a shoulder 1477, formed thereon, into engagement with the square stud. As this occurs, the lug 1476 will slide off the top of the dog 1471, which is prevented from moving to the right by the stud 1474, thereby alining a recess formed on the under side of the lever 1429 with the upper end of the dog 1471. As the lever is elevated, the triangular plate 1448 will release the pawl 1445, and, when the lever moves to the right, the stop setting arm 1434 will move therewith and engage with the tooth on the pawl. The lug 1475 is of sufficient width to prevent its becoming disengaged from the lifting dog when the arm 1434 moves to the right, and continued upward movement of the dog will cause the arm to be elevated a corresponding distance. The pawl 1445 will then engage with either the notch 1443 or 1444, depending upon the height to which the dog is elevated by the "tab" key 1450.

In the machine shown and described herein, the "tab" key is provided with sufficient throw to elevate the dog to a point where the pawl will engage with the notch 1444. The tab stop setting arm will thus be held in its elevated position and will therefore yieldingly hold the tab stop arm 1426 also in elevated position, these two arms moving together as a unit by virtue of the spring 1442, which holds the stud 1441 against the under side of the arm 1434. If the stop setting arm 1434 is elevated to a sufficient height to permit the pawl 1445 to engage with the notch 1444, the abutment face 1427 on the tab stop arm will be held in its highest or "normal tab" position, whereas, if the pawl engages with the notch 1443, the abutment face will be held in its intermediate or "skip tab" position. In any event, the tab stop arm is yieldably held in its elevated position by the spring 1442 and may be depressed while the arm 1434 remains in its "set" or elevated position by the stretching of the spring 1442. Thus, if a reverse tabulation operation should take place while the arm 1426 is held in one of its raised positions, any of the tab stops 1381, 1392, or 1393, striking against an inclined face 1478 formed on the arm, will depress the arm and permit the stop to ride thereover without injury to the tabulating mechanism.

As shown in Figure 10, the lever 1429 has a depending arm 1479, which bears a stud 1480 adapted to cooperate with the lower end of an arm 1481, which is integral with an arm 1372 pivoted on the stud 1280, as shown in Figure 8. The arm 1372 has a bent-over ear 1373, which underlies the left-hand ends of the escapement pawls 1283 and 1284. Hence, with the lever 1429 lifted off of the square stud 1432 and moved to the right by the spring 1431, the stud 1480 will engage the arm 1481 and rock the arm counter-clockwise, so as to cause the ear 1373 to lift the escapement pawls 1283 and 1284 out of engagement with the rack teeth 1291 and so free the carriage for movement. Inasmuch as the hydraulic drive mechanism is normally conditioned to move the traveling carriage in a forward direction, the carriage will be resiliently urged to move toward the left, as viewed in Figures 10 and 12, until one of the tab stops strikes against the abutment face 1427 on the tab stop arm. When this occurs, the arm will be forced to the left, thereby carrying the lever 1429 to the left against the urgency of the spring 1431 until the stud 1480 releases the arm 1481 and thereby allows the escapement pawls to again engage with the rack teeth and stop the carriage. This movement of the lever 1429 to the left will cause it to move off of the square stud 1432, and it will then be moved down by the spring 1436 to the position shown in Figure 10, where the square stud engages with the shoulder 1433 on the lever. The triangular plate 1448 will engage the arm 1449 on the pawl 1445 and move the pawl out of engagement with the notches on the tab stop setting arm, so as to permit this arm to be lowered under the urgency of the spring 1435 until the under side of the arm is brought to bear against the square stud 1432. The tab stop arm 1426 will also be lowered to its ineffective position, as shown in Figure 12, and the parts will thus be restored to their normal positions, ready for another tabulating operation.

It is to be observed that, even though the "tab" key be held depressed after one of the tab stops strikes against the abutment face 1427, the tab stop arm 1426 will none the less be restored to its home position by virtue of the flexible connection between the dog 1471 and the lever 1464. As a result of this construction, when the lever 1429 is moved to the left by the engagement of a tab stop against the abutment face 1427, the left-hand side of the lug 1476 will engage the upper end of the lifting dog 1471 and rotate it counter-clockwise against the urgency of the spring 1473. The lug 1475, formed on the tab stop setting arm 1434, will also engage with the dog 1471 and rock it still farther counter-clockwise until the latter arm is once again in its home position, resting on the square stud 1432. The tab stop arm 1426 will therefore be lowered to its ineffective position, even though the tab key be held depressed by the operator and cannot be again lifted by the use of this key until it has been released and depressed a second time.

In general, then, the operation of the tabulating mechanism is as follows: The tab stop arm 1426 and its abutment face 1427 are elevated to a predetermined height, so as to cooperate with a selected one of the tab stops 1381, 1392, and 1393. At the same time, the escapement pawls are disabled and the traveling carriage is released for movement in a forward direction. When one of the tab stops strikes against the abutment face, the tab stop arm will be moved toward the left and permitted to drop back to its inactive position, and at the same time the escapement pawls will be released and permitted to once again engage with the rack teeth so as to hold the carriage in its new position.

*Reverse tabulation control mechanism (Figures 8, 9, 13, and 15)*

The present machine is provided with a reverse tabulation control mechanism which operates in a manner similar to the forward tabulation control mechanism hereinbefore described. This mechanism is shown in Figures 9, 13, and 15 and consists of a reverse tabulation stop arm 1520, which is pivotally mounted on a stud 1521 secured to a reverse tabulation lever 1522, which lies in front of the angle bar 216. The stop arm 1520 is provided with a stud 1523, which is urged against the lower edge of a stop setting arm 1524 by a spring 1525. The arm 1524 is urged downwardly into engagement with a square stud 1526, secured to the forward face of the angle bar 216, by means of a spring 1527 (Figure 13) stretched between the arm and the lever 1522. The latter lever is provided with an elongated slot 1531, which engages with a stud 1532 secured to the angle bar 216. The lever is urged toward the left, as viewed in Figure 13, by a spring 1533, which is stretched between a stud secured to the angle bar 216 and an arm 1534 pivoted on the lever at 1535. The arm 1534 has a depending tail 1536, which bears against a stud 1537 secured to an arm 1538 fast on a reversing shaft 1539. The stud 1537 is received in a slot 1540 (Figure 15), formed in the lever 1522, and is normally held in the rear portion of the slot by the tail 1536.

The reverse tab lever 1522 has formed thereon a shoulder 1541, which is urged into engagement with the square stud 1526 by a spring 1548 (Figure 9). Lying beneath the lever 1522 is a lifting lever 1542, having a slot 1544, which pivotally engages a stud 1543 secured to the angle bar 216. The left-hand end of this lever is provided with a thickened nose 1545, which lies beneath both the reverse tab lever 1522 and the stop setting arm 1524. The right-hand end of the lifting lever is connected by a pin-and-slot connection 1546 with the upper end of a pitman 1547 (see also Figure 25), which may be depressed so as to cause the nose 1545 to be elevated. When this occurs, the lever 1522 will be elevated against the force exerted by the spring 1548 and so cause the shoulder 1541 to be moved off of the square stud 1526, thereby permitting the lever 1522 to be moved toward the left under the urgency of the spring 1533. At the same time, a downward extension on the left-hand end of the lever 1522 will release a stud 1549 (Figure 9) carried by a pawl 1550 pivotally mounted on a stud 1551 secured to the angle bar 216. This will release the pawl to the action of a spring 1552, which will urge the nose of the pawl into engagement with notches 1553 provided in the left-hand end of the stop setting arm 1524. When the reverse tab lever 1522 is moved to the left by the spring 1533, its lower edge will move off of the nose 1545 of the lifting lever 1542 and permit the latter to continue its lifting movement of the stop setting arm 1524 without further affecting the lever 1522.

As illusrated by the dot-and-dash outline shown in Figure 13, the stop arm 1520 and the stop setting arm 1524 may be elevated to any one of four positions, where the latter arm will be held by engagement of the pawl 1550 with one of the notches 1553 or with the finished surface 1554 provided on the lower edge of the arm 1524. When the carriage return stop arm 1520 is elevated to its highest position, as indicated in dot-and-dash lines in Figure 13, an abutment face 1555 provided thereon will be in a position to cooperate with the No. 1 carriage return stop 1385 and also with any of the remaining stops, No. 2, No. 3, or No. 4. When the stop arm is raised to its next-to-highest position, the abutment face 1555 will be raised high enough to cooperate with the No. 2, No. 3, and No. 4 stops but will pass beneath the No. 1 stop. Similarly, when the arm is raised to its third-from-highest position, it will lie in the path of the No. 3 and No. 4 stops but will pass beneath the No. 1 and No. 2 stops. In a like manner, when the arm is raised to its lowest effective position, it will lie in the path of the No. 4 stop but will pass beneath the No. 1, No. 2, and No. 3 stops.

When the reverse tab lever 1522 moves toward the left under the influence of the spring 1533, the reversing shaft 1539 will be rotated counter-clockwise, as viewed in Figure 13, by reason of the cooperation of the stud 1537 with the slot 1540. The shaft 1539 is journaled at its forward end in the angle bar 216 and at its rear end in the rail 217 (see Figure 15). Secured to the shaft 1539 near its rear end is an arm 1561, bearing a stud 1562, which cooperates with a bifurcation provided in the upper end of a lever 1563, which is pivoted on a stud 1564, secured to a cross bar (not shown). Pivotally secured to the lower end of the lever 1563 is one end of a link 1565, the other end of which is pivoted to the arm 372, fast on the shaft 367. Hence, when the lever 1522 is lifted off the square stud 1526 and allowed to move to the left under the influence of the spring 1533, so as to cause the shaft 1539 to be rocked counter-clockwise, the lever 1563 will be rocked clockwise and the arm 372 will be rocked counter-clockwise, so as to lower the coupler 329 into engagement with the pin 338 and thus cause the carriage drive to be reversed.

Also secured on the shaft 1539, just behind the angle bar 216, is an arm 1566 (Figure 8) bearing a stud 1567, which cooperates with a finger 1568 formed on a lever 1370 free on a stud 1371 in the angle bar 216. A left-hand extension of the lever 1370 engages the bottom surface of the ear 1373 of the arm 1372. Thus, when the shaft 1539 is rocked counter-clockwise, the stud 1567 will cooperate with the finger 1568 to rock the lever 1370 clockwise and thereby cause the escapement pawls 1283 and 1284 to be moved out of engagement with the rack teeth 1291. The carriage will thus be free to move in a reverse direction until a carriage return stop strikes against the carriage return stop arm 1520 and restores the parts to their normal positions.

When one of the reverse tab stops strikes against the abutment face 1555 of the arm 1520, the latter and the lever 1522 will be moved to the right and the shoulder 1541 will again be moved into engagement with the square stud 1526 under the influence of the spring 1548. The stop setting arm 1524 will also be moved to the right so as to disengage the notches 1553 from the pawl 1550, thereby permitting the latter arm to be restored to the position shown in Figure 13 under the influence of the spring 1527. The stop arm 1520 will thus be returned to its ineffective or home position, where it will remain until another operation of the reverse tabulating mechanism takes place.

It should be noted at this point that, even though the lifting lever 1542 is maintained in its elevated position, the lever 1522 may be restored to its original position in engagement with the square stud 1526 by reason of the slot 1544 provided in the lever 1542. If the nose 1545 is held elevated at the time that a carriage return stop strikes against the stop arm 1520, the lever 1522 will press against the left-hand end of the lifting lever 1542 and move the latter to the right against the influence of a spring 1569, secured between the right-hand end of the lever and a tail formed on a latch 1570 pivotally mounted at 1571 on the rear end of the carriage return lever 1522. When the lifting lever is finally lowered to the position shown in Figure 13, the spring 1569 will shift the lever to the left until the stud 1543 engages with the right-hand end of the slot 1544.

The hereinbefore-mentioned latch 1570 cooperates with a shoulder 1572 formed on the arm 1538, the latch engaging beneath this shoulder when the reverse tab control mechanism is set by depression of the pitman 1547. When the lever 1522 shifts to the left and the arm 1538 rocks counterclockwise, the latch will be able to engage beneath the shoulder 1572. When the abutment face 1555 on the stop arm 1520 engages with a carriage return stop and causes the lever 1522 to be shifted to the right, the latch 1570, which is provided with a bend or form 1573, which is pressed by the spring 1569 against a finger 1574 provided on the lever 1522, will prevent clockwise rotation of the arm 1538 and the shaft 1539, thus causing the stud 1537 to move part way out of the slot 1540 against the pressure placed on the tail 1536 by the spring 1533. The latch 1570 will continue to be effective to prevent clockwise rotation of the shaft 1539 until just before the shoulder 1541 engages with the square stud 1526, at which time the latch 1570 will be moved by the finger 1574 out from beneath the shoulder 1572 and permit the shaft to be snapped back into its original position, as shown in Figure 13, by the spring 1533. Thus, the carriage drive mechanism will remain effective to operate the carriage in its reverse direction, and the escapement pawls will be held out of engagement with the rack teeth 1291 up until the last instant before the parts are returned to their normal positions, as illustrated in Figure 13.

Reverse tabulation control keys (Figures 25, 33, 34, and 35)

Referring now to Figure 25 of the drawings, it will be seen that the pitman 1547 is provided at its lower end with a bifurcation which engages with a headed stud 1575, so as to guide the lower end of the pitman in its up-and-down movements within the machine. The pitman is also provided with a formed-over ear 1576, which cooperates with the rear end of an arm 1577 (see also Fig. 34) pivotally mounted on a stud 1578 secured to the bracket 283. Integral with the arm 1577 is an arm 1579, which is bifurcated at its lower end so as to cooperate with a stud 1580, secured in the end of an arm 1581 secured to a shaft 1582 journaled at its left-hand end in brackets 287 secured to the machine framework. The shaft 1582 is adapted to be rocked counterclockwise by any one of three "reverse tab" control keys 1583 (Figure 33), located along the right-hand edge of the typewriter keyboard, thereby causing the arm 1577 and the pitman 1547 to be lowered. Each of the keys 1583 is connected with a key lever 1584 (Figure 34) pivoted on the rod 454 and cooperating with an actuating cam 1585 mounted in a hanger 1586. The actuating cams 1585 are of the one-revolution type and are adapted to cause their associated hangers 1586 to be rotated counterclockwise about the rod 466. Each of the hangers 1586 is provided with a depending arm 1586, to which is attached one end of a spring 1588, the other end of which is secured to one of the rods 481. These springs urge a tongue, formed on an adjustment bracket 1589 secured to each of the hangers, into engagement with the under side of the rod 438, thereby maintaining the parts in the positions which they occupy in Figure 34. Also mounted on the lower end of each of the arms 1587 is an eccentric 1590, to which is secured a notched adjustment disc 1591 for retaining the eccentric in any position to which it may be adjusted. Each eccentric is adapted to cooperate with a curved arm 1592 secured to the shaft 1582, so as to cause the shaft to be rocked each time a "reverse tab" control key is operated. By adjusting the eccentrics 1590, the shaft 1582 may be rocked to varying degrees by the different keys, thereby moving arms 1579 and 1577 clockwise about the stud 1578 and causing the pitman 1547 to be depressed to different extents depending upon which of the keys is operated. Thus, the keys 1583 may be used to select different columns to which the traveling carriage will be tabulated when the keys are operated. For example, in the case of the machine presently being described, the No. 1 "reverse tab" key is set to select a No. 4 reverse tab stop; the No. 2 key a No. 2 stop; and the No. 3 key a No. 3 stop.

An additional "reverse tab" control key 1593 (Figures 25 and 35) is mounted on the right-hand side of the accounting machine keyboard, this key being controlled by an adjustment to cause the carriage to be moved in a reverse direction to any selected stop or stops. As shown in Figure 25, the key 1593 is slidably mounted on studs 1594 secured to the bracket 283 and, at its lower end, bears a stud 1600, which engages with the top edge of the arm 1577. The lower end of the key cooperates with the notched upper end of an adjustable stop 1601, pivoted to the bracket 283 at 1602 and held in adjusted position by means of a clamping nut 1603. Hence, by adjusting the position of the stop 1601, the extent to which the pitman 1547 will be depressed by depression of the key 1593 may be varied as desired. It is to be noted that the pitman is constantly urged into its raised position by a spring 1604, which is stretched between the pitman and a stud mounted on the bracket 283. The pitman will, therefore, always be urged to return to its raised or ineffective position.

Stop sensing mechanism (Figures 16, 17, 18, and 19)

As mentioned earlier herein, nearly all of the functions performed by this machine may be controlled by the traveling carriage. In order to relieve the traveling carriage of the load which would be imposed upon it if it were required to depress function control levers or like elements in order to effectuate these controls, a sensing mechanism is provided for feeling the function control plates 1405 carried by the stops 1374 while the carriage is located in one of its various columnar positions.

As shown in Figures 16 and 17, this mechanism consists of sensing fingers 1889. As shown in Figures 17, 18, and 19, the sensing fingers are formed on the upper ends of sensing members, which may take any one of four different forms, as indicated by the reference numerals 1890, 1891, 1892, and 1893. The sensing members are all guided at their upper ends by means of slots formed in a guide plate 1894, secured to a square post 1900, which in turn is secured to the angle bar 216. At their lower ends, each of the members is pivotally connected to one of a series of sensing levers, which are adapted to be controlled by the fingers 1889 as the result of their engagement with the stepped control plates 1405. Thus, each of the sensing members 1890 is pivotally connected to the right-hand end of a sensing lever 1901, which levers are alternately mounted on studs 1902 and 1903, located in a frame plate 1904, which is supported from the vertical portion of the angle bar 216 by means of short posts 1905. Each lever is urged counterclockwise by a spring 1906, so as to tend to move the sensing fingers into engagement with the plates 1405. Near its left-hand end, each lever 1901 is provided with a pair of guide fingers 1907 and 1908, which cooperate with grooved studs 1909 and a slotted guide plate 1910, respectively, in order to guide the levers in their up-and-down movements. Lying beneath a finished surface 1911 formed on the lower edge of each of the levers 1901 is a sensing mechanism control slide 1912 (see also Figure 20), which is mounted for vertical sliding movement on studs 824 (only one shown) secured to the side frame 214. The slide 1912 is provided near its lower end with a pin 1914 (Figure 20), which engages with a slot provided in a lever 1915, which is pivoted on a stud 1916 mounted in the left side frame. The lower end of the lever 1915 carries a stud 1917, which cooperates with a bifurcation provided in the upper end of a lever 1918, which is loosely journaled on the shaft 802. The lever 1918 is provided with a depending tail 1920, which is adapted to cooperate with rolls 1921, 1922, and 1923, which are mounted on studs supported by the plate cam 1147.

When the main cam shaft 253 rotates counterclockwise, as viewed in Figure 20, the roll 1921 will move out from under the tail 1920, thereby permitting the springs 1906 to force down the control slide 1912 and thus permit the sensing fingers 1889 to move upward into engagement with the lower edges of the plates 1405. As illustrated in Figure 17, each of the plates 1405 is provided on its lower edge with two abutment surfaces, one adapted to cooperate with the left-hand row of sensing fingers 1889 and the other being adapted to cooperate with the right-hand row of fingers. Either of the abutment surfaces may be cut to any one of four different lengths or heights, the "zero" length indicated in Figure 17 being the equivalent of no plate at all, the "A" or "addition" length being effective to stop the fingers just short of their full travel, the "S" or "subtraction" length being effective to stop the fingers in an intermediate positon, and the "T" or "total" length being effective to stop the fingers after they have moved but a very short distance. The sensing fingers 1889 will be restored to their lowered positions, as shown in Figure 17, toward the close of the machine cycle by means of the roll 1923 (Figure 20) engaging with the tail 1920 to thereby elevate the slide 1912. After the roll 1923 moves beyond the tip of the tail 1920, the succeeding roll 1922 will serve to keep the slide elevated until the roll 1921 engages with the tail, so as to retain the slide elevated at the end of the machine cycle, as shown in Figure 17.

In order to insure that the slide 1912 is lowered at the proper time in the machine cycle, the lever 1918 has secured thereto an arm 1924, the lower end of which is adapted to be engaged by a stud 1925 secured to the right-hand face of the cam 1147. This provides a positive means for supplementing the action of the springs 1866 in depressing the slide 1912, thereby insuring that the lever 1915 will be rocked clockwise in the early part of the cycle. This is necessary in order to insure the operation of certain of the automatic overdraft mechanism at the very beginning of the cycle.

The control slide 1912 is provided near its upper edge with a notch 1926, which engages with the rounded end of a lever 1927 (Figure 17) pivoted on a stud 1919, secured to the frame plate 1904. The other end of this lever is provided with a stud 1928, which works in a slot provided in one of the side arms 1930 of a yoke 1929. The side arms 1930 are mounted for pivotal movement on a stud 1931 mounted in the frame plate 1904, and the yoke 1929 is arranged to overlie a series of lugs 1932, formed on the sensing members 1892 and 1893, to thereby control the sensing action of the fingers 1889 associated therewith. It will thus be evident that, when the slide 1912 is lowered, the yoke 1929 will be raised to thereby permit the sensing fingers on these sensing members to be lifted into engagement with the control plates 1405.

As shown in Figure 18, the member 1892 is pivotally secured to an arm 1933, which is pivotally mounted on a stud 1934 secured to the frame plate 1904. Also pivotally mounted on the stud 1934 adjacent to the arm 1933 is an arm 1935, bearing a stud 1936, which underlies a right-hand extension of the arm 1933. The latter extension is maintained in contact with the stud 1936 by means of a spring 1937, connected between the extension and a stud on the arm 1935. This assembly, consisting of the arms 1933 and 1935, is urged clockwise about the stud 1934 by means of a spring 1938, thereby urging the member 1892 in an upward direction so as to maintain the lug 1932 in engagement with the yoke 1929. In the present instance, there are three of the sensing members 1892, each of which is pivotally connected to a sensing lever assembly similar to that formed by the arms 1933 and 1935. These are shown in Figure 16, wherein the arms corresponding to the arm 1935 are designated by the reference numerals 1939 and 1940. These arms are pivotally mounted on the stud 1934 and are flexibly connected to arms similar to the arm 1933, which in turn are pivotally secured to the members 1892, all as shown and described in connection with Figure 18. The arm 1935 is connected with the carriage throat and paper feed mechanism; the arm 1939 is connected with the forward tabulation mechanism; and the arm 1940 is connected with the reverse tabulating mechanism.

*Motor bars per se (Figures 21, 22, 24, and 35)*

As mentioned earlier herein, the present machine is provided with a plurality of motor bars located on the right-hand side of the keyboard, which serve to initiate operations of the machine and also to control certain functions thereof. The mechanism controlled by the several motor bars for causing the main clutch to be engaged and the machine to be operated is shown in Figures 21 and 22. As shown in these figures, the machine is provided with a "main" motor bar 2050, a "skip" motor bar 2051, and a "vertical" motor bar 2052, which motor bars are slidably mounted on studs 2053 secured to the right side frame 215. In the case of the motor bars 2051 and 2052, an auxiliary slide 2054 is slidably mounted on the studs 2053 adjacent to the stems of the motor bars. Each slide is provided with a vertical slot 2055, which cooperates with a stud 2056 secured in the stem of the associated motor bar 2051 or 2052. Each slide is normally maintained in its raised position with the stud 2056 seated in the lower end of the slot 2055 by means of a spring 2057 stretched between the slide and a stud 2061 secured to a latch 2058 pivotally mounted on a stud 2059 secured to the right side frame. In each instance, the latch 2058 is adapted to cooperate with a notch 2060 formed in the edges of the slides to thereby retain the latter in their lower positions whenever their associated motor bars are manipulated. Hence, depression of either of the motor bars 2051 or 2052 will cause the slides associated therewith to be carried down and retained by the latches 2058, while the motor bars themselves will be permitted to return to their raised or normal positions by means of restoring springs 2062.

Each slide 2054 is provided with a formed-over ear 2063, which engages with a finished pad formed on the top edge of a substantially horizontal link 2064. Similarly, the main motor bar 2050 is provided with a formed-over ear 2065, which engages with another finished pad provided on the upper edge of the link 2064. The link 2064 is carried by a pair of bell crank levers 2066, which are pivotally mounted on studs 2067 secured to the side frame 215. As shown in the drawings, the link is pivotally connected at either end to one of the horizontally-extending arms of the bell crank levers, while the depending arms of these levers are connected together by a link 2068, thereby causing parallel movement of the link 2064.

Mounted on the link 2064 is a stud 2070, on which is pivotally mounted a pressure arm 2071, which is provided with a finger 2072, which is urged into engagement with a spring stud mounted on the link 2064 by a spring 2073. The pressure arm 2071 is provided with a bent-over ear 2074 (see also Figure 22), which lies above the left-hand end of a lever 2075 pivotally mounted on a stud 2076 secured to an auxiliary frame plate 2083 (Figure 24), said lever being urged clockwise about the stud by means of a spring 2077. The lever 2075 carries a square stud 2078, which cooperates with a notch 2079 formed in the lower edge of a clutch control slide 2080 supported for horizontal sliding movement on studs 2081 and 2082 mounted in the auxiliary frame plate 2083. The slide 2080 carries a stud 2084, which is engaged within a bifurcation provided in the upper end of an arm 2085 secured to the shaft 282. Hence, the slide is constantly urged toward the front of the machine by the spring 285, but such movement is normally prevented by engagement of the square stud 2078 with the rear end of the notch 2079. Whenever any of the motor bars are depressed, however, the link 2064 and the pressure arm 2071 will be moved down so as to cause the ear 2074 to engage with the end of the lever 2075 and move the square stud out of engagement with the notch on the slide, thereby permitting the latter member to moved toward the front of the machine under the influence of the spring 285. At the same time, the tripping arm 259 will be disengaged from the extension 260 of the clutch control arm, thereby causing the clutch to be engaged and the machine to be given a cycle of operation.

Since it is ordinarily desirable to cause the machine to come to rest at the end of each cycle of operation, even though the motor bar be held depressed by the operator, means is provided for enabling the square stud to reengage the notch in the control slide when the latter member is restored toward the end of the cycle by means of the restoring cam 290 (Figure 24). It will be noted from Figure 22 that the forward edge of the arm 2085 engages with the ear 2074 and will thus cause the pressure arm 2071 to be rocked clockwise against the tension of the spring 2073 when the slide is released for forward movement. This will cause the ear to be moved off the end of the lever 2075, thereby permitting the spring 2077 to urge the square stud into engagement with the lower edge of the slide 2080. Hence, when the slide is restored near the end of the cycle, the square stud will engage with the notch 2079 and retain the tripping arm 259 in engagement with the extension 260 even though the motor bar be held depressed. When the motor bar is released, the pressure arm will move to its raised position, and the spring 2073 will cause the ear 2074 to move over the end of the lever 2075, thus restoring the parts to the positions shown in Figure 22.

In order to release the auxiliary slides 2054 from the restraint of the latches 2058 near the end of the machine cycle, the slide 2080 is provided with a pair of latch-releasing fingers 2086, which will engage the studs 2061 on the latches as the slide is restored toward the end of the cycle to thereby disengage the latches and permit the auxiliary slides to be restored to their inactive positions by the springs 2057.

*Traveling carriage control of tabulation*

In Figure 25 is shown a slide 2180, which is one of four companion control slides and controls the reverse tabulation mechanism of the machine and may therefore be referred to as the reverse tabulation slide. As shown in this figure, the slide is provided with elongated slots by means of which it is slidably mounted on the studs 2081 and 2082. The slide is resiliently urged toward the front of the machine by a spring 2184 but is normally retained in its rearward position against the urgency of this spring by a rod 2185, secured in the upper end of a lever 2186, which is pivotally mounted on a stud 2187 secured to the auxiliary frame plate 2083. To the lower end of the lever 2186 is pivotally connected the forward end of a link 2188, the rear end of which is pivotally connected to the upper end of a follower arm 2189, which is freely rotatably on the shaft 923 and is provided with rolls which cooperate with a pair of companion plate cams 2190 and 2191, which are secured to the main cam shaft 253. Hence, during each cycle of operation of the machine, the rod 2185 will be moved toward the front of the machine, thereby permitting the slide 2180 to be moved forwardly under the influence of the spring 2184.

The lever 2186 also carries an aliner bar 2192, which is adapted to engage with the aliner notches 2193 formed in the lower edge of the slide so as to aline and hold the slide firmly in the position which it has assumed while it is being sensed by the feeling mechanism presently to be described.

After the slide 2180 has been differentially positioned, as will be explained presently, its positioning is then sensed by a sensing lever 2207 pivotally mounted on a stud 2208 secured to the right side frame 215. The lever 2207 is urged counter-clockwise about said stud by a spring 2209 stretched between the lever and a bracket 2210 fastened to the right side frame.

When the machine is at rest, the sensing lever is held in the position shown in Figure 25 by a stud 2211 engaging with a heel 2212 formed on the lower end of a depending arm of the sensing lever. The stud 2211 is mounted in the upper end of a follower arm 2213 (see Figure 31), which is pivotally mounted on the shaft 923 beside the follower arm 2189 and which carries at its lower end a roll 2214, which engages with the periphery of a plate cam 2215 secured to the main cam shaft 253. Hence, when the machine is put through a cycle of operation, the follower arm will be rocked clockwise, so as to release the sensing lever 2207 to the pull of the spring 2209 and thereby cause a sensing finger 2216, formed on the left-hand end of the lever, to sense a series of graduations formed on the rear end of the reverse tabulation slide. The graduations are indicated collectively by the reference number 2217 and are marked as follows in Figures 30–*a*, 30–*b*, 30–*c*, and 30–*d*: "#2 stop"; "#3 stop"; "#4 stop"; and "Inactive."

The sensing lever 2207 bears a stud 2218 (Figure 25), which lies above an arm 2219 formed on the pitman 1547. Hence, when the sensing lever senses one of the graduations on the slide, the stud 2218 will engage the arm 2219 and carry the pitman down with it so as to set the reverse tabulation stop arm 1520 (see Figure 13) in position to cooperate with either the #4, #3, or #2 reverse tab stops.

In order to prevent an overthrow of the pitman as a result of the rather high-speed sensing movement of the lever 2207, the pitman is provided with a formed-over ear 2220 (Figure 25), which is adapted to cooperate with a series of graduations 2221 formed in the rear end of the slide 2189 and positively stop the downward travel of the pitman at the proper point.

A reverse tabulation operation will take place under control of the traveling carriage when there is a control plate 1405 located on the carriage stop in a predetermined columnar position, which will cause the slide 2180 to be differentially positioned in one of its intermediate positions. This control by the traveling carriage is exercised by way of a control lever 2222 (Figures 25 and 30), which is pivotally mounted on a stud 2223, which is supported between the auxiliary frame plate 2083 (see Figure 24) and the subsidiary plate 2095. The rear end of the control lever is pivotally connected to the lower end of a link 2224, which is pivotally connected at its upper end to the right-hand end of the sensing arm 1940 (Figure 16). The sensing lever 2222 has formed thereon a stop finger 2225, which is adapted to cooperate with a series of graduations 2226 formed on the slide 2180. As shown in Figures 30-a, 30-b, 30-c, and 30-d, the reverse tabulation slide will be stopped in one of its four moved positions, depending on the length of the control plate 1405. This will cause the stop arm 1520 (Figure 13) to be set into a position to cooperate with a #2, #3, or #4 stop, with a #3 or #4 stop, with a #4 stop only, or not to be set at all where a control plate has been omitted from the carriage stop or where the plate is cut so short as to permit the sensing member to move to its extreme limit of upward travel as determined by engagement of a shoulder 2227 (Figure 30-d) on the member with the under side of the guide plate 1894.

The means whereby the traveling carriage may control the forward tabulation mechanism includes one of the companion control slides, a forward tabulation slide 2181 (Figure 26) slidably mounted on the studs 2081 and 2082 and urged toward the front of the machine by a spring, the same as the slide 2180. The forward tabulation slide is normally held in its home position by means of the rod 2185 but is released thereby during the cycling of the machine so as to permit it to move forwardly and be positioned, after which it will be alined by movement of the bar 2192 into alining notches provided along the lower edge of the slide, all as described above in connection with the reverse tabulation slide. On the rear end of the slide is provided a series of graduations 2231, which are adapted to be sensed by a sensing lever 2232, which has a sensing finger 2233 formed thereon for engaging the graduations. This sensing lever is, like the sensing lever 2207, pivotally mounted on the stud 2208 and urged to rotate counter-clockwise by a spring 2234, which rotation, however, is controlled by the stud 2211 mounted in the upper end of the cam follower arm 2213. The sensing lever is connected by a wire link 2235 to the lifting lever 1464 (see Figure 10) to thereby control the setting of the tab stop arm 1426. As indicated by the legends in Figures 29-a and 29-b, the slide will control the sensing lever to cause a skip-tab operation when the slide is blocked against any forward movement, a non-tab operation when the slide is permitted to partake of one step of forward movement, and a normal tabulating operation when the slide is permitted to move two steps forward.

As in the case of the reverse tabulation slide, the forward tabulation slide 2181 may be controlled from a carriage stop, there being provided for this purpose a control lever 2239 (Figure 26), which is pivotally mounted on a stud 2240 extending between the auxiliary frame plate 2083 and the subsidiary plate 2095. This lever is provided with a stop finger 2241, which is adapted to cooperate with a series of graduations 2242 formed on the upper edge of the slide to thereby control the positioning of the slide. The rear end of the lever 2239 is pivotally connected to the lower end of a link 2243, the upper end of which is pivotally connected to the right-hand end of the sensing arm 1939 (Figure 16).

As schematically illustrated in Figures 29-a and 29-b, an "S" length control plate 1405 will cause the lever 2239 to be positioned so as to stop the slide after it has moved one step forwardly, thereby causing a non-tab operation to take place, while an "A" length control plate will elevate the stop finger to a position where it lies above the graduations 2242, thereby permitting the slide to move all the way forwardly and causing a normal tabulating operation to result. As illustrated by the dot-and-dash lines in Figure 29-b, if no control plate is present, the lever will be elevated still more, so as to again permit a normal tab operation. However, if a "T" length control plate is present, the control lever 2239 will be very slightly elevated and the finger will cooperate with the first graduation, as illustrated in Figure 26, to thereby prevent any forward movement of the slide and cause a skip-tab operation to take place.

In order to insure that a reverse tabulation operation and a forward tabulation operation may not both be initiated during the same cycle of operation under the control of their respective slides, the forward tabulation slide 2181 is provided with an upstanding arm 2244 (Figures 25 and 26), which is adapted to be engaged by a formed-over ear 2245 on the sensing lever 2222. This ear will be effective to stop the tabulation slide 2181 after it has moved forward one step whenever an "A," "S," or "T" length control plate 1405 is effective to control the lever 2222, while the ear will be elevated clear above the arm 2244 if no control plate is present. Hence, it will be impossible, as a result of inadvertent operation, to cause both a forward tabulating operation and a reverse tabulating operation to be called for during the same cycle.

In order to permit a "hold skip tab" operation to be controlled from the "skip" motor bar (Figure 21), the lower end of the stem of this motor bar bears a stud 2250, which engages with an aperture formed in the forward end of a lever 2251 pivotally mounted on a stud 2252 secured to the right side frame. The rear end of this lever is pivotally connected to the lower end of a link 2253 (see also Figure 12), the upper end of which is pivotally connected to the right-hand end of a depressor lever 2254 pivotally mounted on the stud 2143. The left-hand end of the lever is provided with a rounded nose 2255, which is adapted to engage an extension 2256 formed on the right-hand end of the tabulating stop arm 1426. The construction and arrangement of this mechanism are such that, when the "skip" motor bar 2051 is moved to its "hold" position, the nose 2255 will engage the extension 2256 and depress the arm 1426 to its lowest effective position, which is the "hold skip tab" position of the arm. Hence, a direct connection is provided between the "skip" motor bar and the tab stop arm whereby the latter will always be moved to its "hold skip tab" position whenever the motor bar is depressed and held in its "hold" position.

While the form of mechanism herein shown and described is admirably adapted to fulfill the objects primarily stated, it is to be understood that it is not intended that the invention shall be confined to the particular embodiment disclosed herein but rather that it shall extend to all structures employing the principles taught herein.

What is claimed is:

1. In a machine of the class described having a frame and a traveling carriage adapted for movement in one direction or another back and forth across said frame, the combination of means for resiliently urging said carriage to move in said one direction across said frame; normally effective means for restraining the movement of said carriage in said one direction; a series of graduated stop members on said carriage; a member slidably mounted on said frame for movement in the same direction as said traveling carriage, said member having a normal position and a moved position and being yieldably urged to move from said normal position to said moved position; means for releasably holding said member in its normal position; an abutment arm pivotally mounted on said member, said arm being adjustable from a normal or ineffective position, where it lies out of the path of movement of said stop members, into any one of a plurality of effective positions, where it lies in the path of selected ones of said graduated stop members; and means for operatively connecting said slidable member with said restraining means so as to cause said latter means to be rendered ineffective when said member is released from said holding means and allowed to move from its normal position to its moved position, and to cause said restraining means to again be rendered effective when said member is restored to its normal position as a result of the action of the stop members striking against said abutment arm.

2. A tabulating mechanism for controlling the horizontal movement of the traveling paper carriage of a bookkeeping machine as it travels in a given direction across the framework of the machine, comprising means urging the carriage to move in said given direction across the machine; one or more stop elements on said carriage; a tabulating control arm slidably and pivotally mounted on said framework, said arm being slidable in a direction parallel to the direction of travel of said carriage and also rotatable in a vertical direction; means for yieldably urging said arm to move horizontally in a direction opposite to said given direction and also to rotate so as to lower said arm; a step formed on said arm; a stationary abutment cooperating with said step for preventing said arm from being moved either horizontally or rotatively under the influence of said urging means; an abutment arm for cooperating with the stop elements on said carriage, said arm being mounted on said tabulating control arm for movement therewith; and means cooperating with said tabulating control arm for moving said arm upwardly so as to disengage the step thereon from said stationary abutment and thereby permit said arm to be moved in a direction opposite to said given direction and to hold said arm elevated with said abutment arm located in the path of said stop elements on said carriage.

3. A tabulating mechanism for controlling the movement of the traveling carriage of a bookkeeping machine as it travels in a given direction across the framework of the machine, comprising means for urging said carriage to move in said given direction across the framework; normally effective means for restraining the movement of said carriage in said given direction; a plurality of stop elements on said carriage; a tabulating control arm slidably and pivotally mounted on the framework of the machine, said arm being slidable in a direction parallel to the direction of travel of the carriage and also rotatable in a vertical direction; means for yieldably urging said arm to move in a direction opposite to said given direction from a normal position to a tabulating position and also to rotate so as to lower said arm; a pair of steps formed on said arm; a stationary abutment cooperating with one of said steps for preventing said arm from being moved either in a direction opposite to said given direction or downwardly by said urging means; an abutment arm mounted on said tabulating control arm for cooperating with said stop elements on said carriage; means for operatively connecting said tabulating control arm with said restraining means whereby sliding movement of said tabulating control arm will control the effectiveness of said restraining means, said restraining means being rendered effective when said arm is in its normal position and ineffective when said arm is in its tabulating position; and means cooperating with said tabulating control arm for elevating said arm until one of said steps moves off of said abutment so as to allow said arm to be moved from its normal position to its tabulating position by said urging means and thereby render said retaining means ineffective and also to bring said abutment arm into the path of said stop elements, where it may be struck thereby and so cause said tabulating control arm to be restored to its initial position and thereby render said restraining means effective to prevent further movement of said carriage.

4. A tabulating mechanism for controlling the movement of the traveling carriage of a bookkeeping machine as it travels across the framework of the machine, comprising means for urging said carriage to move across the framework; normally effective means for restraining the movement of said carriage; a series of graduated stop elements on said carriage; a tabulating control arm slidably and pivotally mounted on the framework of the machine, said arm being slidable in a horizontal plane from a normal position to a tabulating position and rockable in a vertical plane; means for yieldably urging said arm to move from said normal position to said tabulating position; a pair of steps formed in said arm; a stationary abutment cooperating with one of said steps so as to prevent said arm from moving from its normal position to its tabulating position; an abutment device pivotally mounted on said tabulating control arm for rotation in a vertical plane, said device being settable from an ineffective position to any one of a plurality of effective positions where it may cooperate with selected ones of said stop elements; means for operatively connecting said tabulating control arm with said restraining means so as to cause said latter means to be rendered ineffective when said arm is moved to its tabulating position; and means cooperating with said tabulating control arm and said abutment device for simultaneously elevating these parts so as to cause said tabulating control arm to be moved off of said one step and onto the other of said steps where it is free to move to its tabulating position and so render said restraining means ineffective to prevent movement of said carriage, and to cause said abutment device to be set in one of its effective positions, where it will lie in the path of the selected ones of said stop elements so as to be struck thereby during tabulating movement of the carriage and so restore said tabulating control arm to its normal position and cause said restraining means to again be rendered effective to prevent movement of said traveling paper carriage.

5. A tabulating mechanism for controlling the movement of the traveling carriage of a bookkeeping machine as it travels in a forward or a reverse direction across the framework of the machine, comprising means for urging said carriage to move in either a forward or a reverse direction across the framework; normally effective means for restraining the movement of said carriage under the influence of said urging means; a series of graduated stop elements on said carriage; a tabulating control arm slidably and pivotally mounted on the framework of the machine, said arm being slidable from a normal position to a tabulating position in a direction parallel to the direction of carriage travel and rotatable in a vertical plane; means for yieldably urging said arm to move from said normal position to said tabulating position; means for operatively connecting said tabulating control arm with said restraining means so as to cause said latter means to be rendered ineffective when said arm is moved to its tabulating position; a pair of steps formed on said tabulating control arm; a stationary abutment cooperating with one of said steps so as to prevent said arm from being moved from its normal position to its tabulating position; a setting arm pivotally mounted on said tabulating control arm for movement in a vertical plane, said arm being settable from an ineffective position to any one of a plurality of effective positions; an abutment arm also pivoted on said tabulating control arm for movement in a vertical plane, said arm having an abutment face for cooperating with said stop elements to limit the movement of said carriage when traveling in said forward direction and a camming face for enabling said stop elements to ride over said arm when said carriage is traveling in said reverse direction; and means cooperating with said tabulating control arm and said setting arm for simultaneously elevating both arms so as to cause said tabulating control arm to be moved off of said one step and onto the other of said steps where it is free to move to its tabulating position and so render said restraining means ineffective and to cause said setting arm to be set in one of its effective positions where said abutment arm will lie in the path of selected ones of said stop elements and may be struck thereby when said carriage is traveling in said forward direction so as to stop the carriage and restore said tabulating control arm to its normal position where said restraining means will again be effective to prevent movement of said carriage.

6. A tabulating mechanism for controlling the movement of the traveling paper carriage of a bookkeeping machine as it travels in a horizontal plane across the framework of the machine, comprising means for urging said carriage to move across the framework; a tabulating control device slidably and pivotally mounted on the framework of the machine, said device being slidable from a normal position to a tabulating position in a horizontal plane and also rotatable in a vertical plane from a lower or ineffective position to a raised or effective position; means for yieldably urging said device to move from said normal position to said tabulating position; means for releasing said carriage for movement when said device moves from said normal position to said tabulating position; a step on said device; a stationary abutment mounted on said framework and cooperating with said step so as to prevent said device from being moved from its normal position to its tabulating position; a projection formed on the under side of said tabulating control device; a lifting member; a dog pivotally mounted on said member and having a nose thereon cooperating with said projection so as to enable said member to raise said tabulating control device to a position where it is free to move off of said step, said dog having a normal position and a disabled position; spring means for resiliently urging said dog into its normal position; means for operating said lifting member so as to cause said device to be raised off of said step and moved to its tabulating position, where said projection will be moved off of said nose and said nose permitted to move up behind said projection; and elements on said carriage adapted to strike against said device when the latter is in its raised position so as to restore said device to its normal position and cause said dog to be rocked to its disabled position and held in this position until said lifting member is returned to its initial position, whereupon said spring means will restore said dog to its normal position.

7. A tabulating mechanism for an accounting machine having a traveling carriage capable of tabulating movement from one columnar position to another across the machine, comprising means for yieldably urging said carriage to move in a given direction across said machine; means for normally restraining said carriage from movement; means for controlling the tabulating movement of said carriage in said given direction under the influence of said urging means, including a series of graduated stops on said carriage, said stops being located thereon in positions corresponding to the various columnar positions of the carriage, a device operatively connected with said restraining means for controlling the movement of said carriage in said given direction, and an abutment member being selectively settable from an ineffective position to any one of a plurality of stop-engaging positions; means for setting said abutment member to a selected stop-engaging position and for simultaneously causing said device to disable said restraining means and allow the carriage to move in said given direction until said abutment member is engaged by one of said stops and said device thereby restored so as to arrest the movement of said carriage in a particular columnar position; and manipulative means for modifying the setting of said abutment member after it has been set to said selected position so as to cause said abutment member to be engaged by a different one of said stops and thus cause said carriage to be arrested in a different columnar position.

8. A tabulating mechanism for an accounting machine having a traveling carriage capable of tabulating movement from one columnar position to another across the machine, comprising means for yieldably urging said carriage to move in a given direction across said machine; means for normally restraining said carriage from movement; means for controlling the tabulating movement of said carriage in said given direction under the influence of said urging means, including a series of graduated stops on said carriage, a tabulating control member operatively connected with said restraining means for controlling the movement of said carriage in said given direction, a tabulating setting device mounted on said tabulating control member, said device being settable from an ineffective position to any one of a plurality of effective positions, and an abutment member flexibly connected with said tabulating setting device for movement therewith, said abutment member being movable from an idle position to a stop-engaging position, when said setting member moves from said ineffective position to one of said effective positions; means for setting said tabulating setting device to a selected stop-engaging position and for simultaneously causing said tabulating control member to disable said restraining means and allow the carriage to move in said given direction until said abutment member is engaged by one of said stops so as to cause said tabulating control member to reenable said restraining means and thereby cause said carriage to be arrested in a particular columnar position; and manipulative means for moving said abutment member relatively to said tabulating setting device after the latter device has been set to thereby cause said abutment member to be engaged by a different one of said stops and thus cause said carriage to be arrested in a different columnar position.

9. In a machine of the class described, having a frame, a main operating mechanism, means for giving said main operating mechanism cycles of operation, and a traveling paper carriage movable across said frame, the combination of means for urging said carriage to move across said frame; a tabulating mechanism operable to release said carriage for tabulating movement and to arrest said carriage in any one of a plurality of selected columnar positions, said mechanism including a series of graduated stop members on said carriage and an abutment member on said frame arranged to cooperate therewith, said abutment member being movable from a normal position to any one of a plurality of adjusted positions; and a tabulating control mechanism including a member movable to any one of a plurality of positions under the control of said carriage, and an element operable by said main operating mechanism on each cycle of operation of the machine for determining the position of said last-named member and for moving said abutment member to a position in correspondence therewith.

10. In a machine of the class described, having a traveling carriage capable of tabulating movement in one direction or another across the machine, the combination of a resilient driving means for said carriage; reversible connections between said driving means and said carriage, said connections being normally effective to drive said carriage in said one direction across the machine; means for reversing said connections so as to cause said carriage to be driven in said other direction; means for normally restraining said carriage from moving in either of said directions under the influence of said resilient driving means; means for controlling the tabulating movement of said carriage in said other direction, including a stop element on said carriage, a releasable actuating member operably connected with said reversing means and said restraining means for controlling the movement of said carriage in said other direction, and an abutment device carried by said actuating member, said device having an ineffective position and an effective position; and means for moving said abutment device from its ineffective position to its effective position, where it lies in the path of said stop element, and for simultaneously releasing said actuating member to thereby cause said carriage to move in said other direction until said stop element strikes against said abutment device to thereby restore said actuating member and stop said carriage.

11. In a machine of the class described, having a traveling carriage capable of tabulating movement in one direction or another across the machine, the combination of a resilient driving means for said carriage; reversible connections between said driving means and said carriage, said connections being normally effective to drive said carriage in said one direction across the machine; means for reversing said connections so as to cause said carriage to be driven in said other direction; means for normally restraining said carriage from moving in either of said directions under the influence of said resilient driving means; means for controlling the tabulating movement of said carriage in said other direction, including a stop element on said carriage, an actuating member operatively connected with said reversing means and said restraining means for controlling the movement of said carriage in said other direction, said member being movable from a normal position wherein said connections are effective to drive said carriage in said one direction and said restraining means is effective to prevent movement of said carriage to a tabulating position wherein said connections are effective to drive said carriage in said other direction and said restraining means is ineffective to prevent movement of said carriage, means for yieldably urging said member to move from said normal position to said tabulating position, and a positionable abutment device mounted on said actuating member, said device having an ineffective position and an effective position; and means for moving said device to its effective position, where it lies in the path of said stop element, and for simultaneously releasing said actuating member to thereby cause said carriage to move in said other direction until said stop element strikes against said abutment device, thereby restoring said actuating member and stopping said carriage.

12. In a machine of the class described, the combination of a carriage movable in either a forward or a reverse direction; reversible means for resiliently urging said carriage to move in either of said directions; a releasable restraining means for controlling the movement of said carriage in either of said directions; and a carriage reverse tabulating mechanism comprising a stop on said carriage, an actuating member operably connected with said reversible means and said restraining means for controlling the movement of said carriage in either said forward or said reverse direction, said actuating member being effective in one position to cause said reversible means to urge said carriage in a forward direction with said restraining means effective to prevent such movement, and in another position to cause said reversible means to urge said carriage in a reverse direction with said restraining means released so as to permit such movement, yieldable means for urging said actuating member to move from said one position to said other position, an abutment member supported on said actuating member, and means for simultaneously moving said abutment member into the path of said stop and for releasing said actuating member to the urgency of said yieldable means so as to cause said carriage to move in a reverse direction until said abutment member is engaged by said stop and said actuating member thereby restored to said one position so as to cause the movement of said carriage to be arrested.

13. In a machine of the class described, the combination of a carriage movable in either a forward direction or a reverse direction; a power means; a resilient reversible connection between said power means and said carriage for driving said carriage in either of said directions; a releasable restraining means for controlling the movement of said carriage in either of said directions; and a selective reverse tabulating mechanism for causing said carriage to be moved in a reverse direction to any one of a plurality of selected positions, said mechanism comprising a series of graduated stops on said carriage, an actuating member operably connected with said reversible connection and said restraining means for controlling the movement of said carriage in said reverse direction, an abutment member carried by said actuating member, said abutment member being selectively settable to any one of a plurality of stop-engaging positions, and means for setting said abutment member to any one of said positions and for simultaneously enabling operation of said actuating member to thereby cause said carriage to move in a reverse direction until said abutment member is engaged by a selected one of said series of stops to thereby cause said actuating member to be restored and the movement of said carriage to be arrested.

14. In a machine of the class described, the combination of a carriage movable in either a forward direction or a reverse direction; a resilient reversible power drive for moving said carriage in either of said directions; a selective reverse tabulating mechanism for controlling the movement of said carriage in a reverse direction to any one of a plurality of selected positions, said mechanism comprising a series of graduated stops on said carriage, and an abutment member movable into the path of said stops for arresting the movement of said carriage in a reverse direction; and power means for moving said abutment member into any one of a plurality of stop-engaging positions, said means including a power-driven roller, an actuating device, means for engaging said actuating device with said roller so as to cause said device to be moved a predetermined distance by said roller, and an adjustable means carried by said actuating device and connected with said abutment member for determining the position to which said abutment member will be moved by said actuating device.

15. In a machine of the class described having a traveling carriage capable of tabulating movement across the machine either in a forward direction or in a reverse direction, the combination of a reversible driving means for yieldably urging said carriage to move in either of said directions across the machine, said driving means being normally effective to urge said carriage to move in said forward direction; means, including an element movable from a normal position to a reversing position, for reversing said driving means so as to urge said carriage to move in said reverse direction; a selectively operable means connected with said reversing means for moving said element from its normal position to its reversing position so as to urge said carriage to move in said reverse direction; means on said carriage cooperating with said selectively operable means for restoring said last-named means when said carriage has reached a predetermined position in its travel in a reverse direction across the machine; and means controlled by said selectively operable means and cooperating with said element for preventing the element from being moved from its reversing position to its normal position until said selectively operable means has been fully restored.

16. In a machine of the class described, the combination of a carriage movable in either a forward direction or a reverse direction; a power means; a resilient, reversible connection between said power means and said carriage for driving said carriage in either of said directions; a releasable restraining means for normally preventing movement of said carriage in either of said directions; a selective reverse tabulating mechanism for moving said carriage in a reverse direction to any one of a plurality of selected positions, said mechanism comprising a series of graduated stops on said carriage, an actuating member operably connected with said reversible connection and said restraining means for controlling the movement of said carriage in said reverse direction, and an abutment member carried by said actuating member, said abutment member being selectively settable to any one of a plurality of stop-engaging positions; and means controlled by said carriage for causing said abutment member to be set to any one of said positions and for simultaneously enabling operation of said actuating member to thereby cause said carriage to move in a reverse direction until said abutment member is engaged by said one of said stops so as to restore said actuating member and cause said carriage to be arrested.

17. In a machine of the class described, the combination of a carriage movable in either a forward direction or a reverse direction; a power means; a resilient reversible connection between said power means and said carriage for driving said carriage in either of said directions; a releasable restraining means normally effective to prevent the movement of said carriage in either of said directions; and a selective reverse tabulating mechanism for causing said carriage to move in a reverse direction to any one of a plurality of selected positions, said mechanism comprising a series of graduated stops on said carriage, an actuating member operably connected with said reversible connection and said restraining means for controlling the movement of said carriage in said reverse direction, an abutment member carried by said actuating member and selectively settable to any one of a plurality of stop-engaging positions, power-operated means for setting said abutment member, and means including tappets on said carriage for causing said power-operated means to set said abutment member to a selected one of said plurality of stop-engaging positions and for simultaneously enabling operation of said actuating member to thereby cause said carriage to move in a reverse direction until said abutment member is engaged by one of said stops so as to restore said actuating member and cause the movement of said carriage to be arrested.

18. In a machine of the class described, having a carriage arranged for movement back and forth across the machine, the combination of means for urging said carriage to move back and forth across the machine; a rack on the carriage; a first pawl engaging the rack to prevent movement of the carriage in one direction; a second pawl engaging the rack to prevent movement of the carriage in the opposite direction; an extension on the second pawl constructed and arranged to underlie the first pawl so that said first pawl upon being moved out of engagement with the rack will carry the second pawl in unison therewith, also out of engagement with the rack to free the carriage for movement; and tabulating control means cooperating with the first pawl to move it and the second pawl out of and into engagement with the rack to control tabulating movement of the traveling carriage.

19. In a machine of the class described, having a frame and a traveling carriage movable relatively to said frame to various preselected columnar positions, the combination of means to urge said carriage to move in a given direction across the frame; means for restraining the movement of the carriage in said given direction; a series of graduated stops mounted on the carriage in relation to preselected columnar positions thereof; a member mounted on the frame and yieldably shiftable in a direction contrary to carriage travel, said member normally releasably retained against such movement; an abutment arm mounted on the member and movable different extents into the path of the stops so as to cooperate with selected ones of said stops to position the traveling carriage accordingly; means to release the shiftable member and move the abutment arm into the path of the selected stops; and means operatively connecting the shiftable member to the restraining means so that movement of said member upon being released will render said restraining means ineffective and thus free the carriage for movement in said given direction until the selected one of the stops contacts the abutment arm and restores the shiftable member to unreleased position to render the restoring means effective to hold the carriage in selected columnar position.

20. In a machine of the class described, having a main operating mechanism and a traveling carriage movable to preselected columnar positions, the combination of a tabulating mechanism for releasing the traveling carriage for tabulating movement and for arresting said carriage at the end of such movement; means including a tabulating control element operatively connected to the tabulating mechanism for controlling the actuation of said tabulating mechanism; a slide having a control surface thereon for coacting with the control element; means operated by the main operating mechanism to yieldingly urge the slide to move from a normal position in a certain direction to adjust the control surface in relation to the control element; means controlled by the traveling carriage in preselected columnar positions thereof to arrest the slide during its movement in said certain direction to locate the control surface in proper relationship to the control element; and means operated by the main operating mechanism to yieldingly urge the control element to move from a normal ineffective position into engagement with the control surface to control the actuation of the tabulating mechanism in accordance with the columnar position of the traveling carriage.

21. In a machine of the class described, having a frame, a main operating mechanism, means for giving said main operating mechanism cycles of operation, and a traveling carriage movable across said frame, the combination of means for urging the carriage to move across the frame; a tabulating mechanism operable to release the carriage for tabulating movement and to arrest said carriage in any one of a plurality of selected columnar positions, said mechanism including a series of stop members on said carriage, and a settable abutment member on said frame, arranged to cooperate with said stop members; means including a control element for setting the abutment member and for releasing the traveling carriage for tabulating movement; a slide having a control surface thereon for coacting with the control element; means operable by the main operating mechanism to yieldingly urge the slide to move from a normal position in a certain direction; means controlled by the traveling carriage in preselected columnar positions thereof, to determine the extent of movement of the slide in said certain direction to adjust the control surface in proper relationship to the control element; and means operated by the main operating mechanism to yieldingly urge the control element to move from a normal ineffective position into engagement with the control surface to control the setting of the abutment member in relation to the stop members, and to control the release of the traveling carriage for tabulating movement.

22. In a machine of the class described, having a frame, means for giving the machine cycles of operation, and a traveling carriage, the combination of means for urging said carriage to move relatively to said frame in a given direction; means for restraining the movement of the carriage in said given direction; a stop member on the carriage; an abutment device on the frame, said device movable into the path of said stop member; means including a control element yieldably operable on each cycle of machine operation for moving the abutment device into the path of the stop member; means controlled by the abutment device for causing the restraining means to be disabled when said device is moved into the path of the stop member and for causing said restraining means to be reenabled when said abutment device is engaged by said stop member; and means including a slide having a control surface for engagement by the control element, said slide movable to various positions under control of the traveling carriage in preselected columnar positions thereof to adjust said control surface in relation to said control element to cause said element to control the movement of the abutment device into the path of the stop member in accordance with the columnar position of the traveling carriage.

RAYMOND A. CHRISTIAN.
JESSE R. GANGER.
JAMES H. CRAWFORD.
HERBERT C. JOHNSON.

References Cited in the file of this patent
UNITED STATES PATENTS

| Number | Name | Date |
|---|---|---|
| 714,523 | Schlesinger et al. | Nov. 25, 1902 |
| 1,130,039 | Thieme | Mar. 2, 1915 |
| 2,216,636 | Webb | Oct. 1, 1940 |
| 2,318,448 | Anderson | May 4, 1943 |